US011729416B2

(12) United States Patent
Embar Raghukrishnan et al.

(10) Patent No.: US 11,729,416 B2
(45) Date of Patent: Aug. 15, 2023

(54) MODULAR MOTION ESTIMATION ENGINE FOR TREE-BASED VIDEO

(71) Applicant: INTEL CORPORATION, Santa Clara, CA (US)

(72) Inventors: Srinivasan Embar Raghukrishnan, Folsom, CA (US); James M. Holland, Folsom, CA (US); Sang-Hee Lee, San Jose, CA (US); Atthar H. Mohammed, Folsom, CA (US); Dmitry E. Ryzhov, Mountain View, CA (US); Jason Tanner, Folsom, CA (US); Lidong Xu, Beijing (CN); Wenhao Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 370 days.

(21) Appl. No.: 16/651,641

(22) PCT Filed: Dec. 29, 2017

(86) PCT No.: PCT/CN2017/119809
§ 371 (c)(1),
(2) Date: Mar. 27, 2020

(87) PCT Pub. No.: WO2019/127358
PCT Pub. Date: Jul. 4, 2019

(65) Prior Publication Data
US 2020/0314447 A1 Oct. 1, 2020

(51) Int. Cl.
*H04N 19/577* (2014.01)
*H04N 19/513* (2014.01)
(Continued)

(52) U.S. Cl.
CPC .......... *H04N 19/577* (2014.11); *H04N 19/521* (2014.11); *H04N 19/567* (2014.11); *H04N 19/96* (2014.11)

(58) Field of Classification Search
CPC .... H04N 19/176; H04N 19/105; H04N 19/52; H04N 19/70; H04N 19/159; H04N 19/96;
(Continued)

(56) References Cited

U.S. PATENT DOCUMENTS

2008/0153444 A1* 6/2008 Chen ..................... H04L 1/0047
455/205
2010/0290521 A1 11/2010 LIU et al.
(Continued)

FOREIGN PATENT DOCUMENTS

EP 2184925 5/2010
WO 2015063330 5/2015

OTHER PUBLICATIONS

International Search Report and Written Opinion for International Patent Application No. PCT/CN2017/119809, dated Aug. 29, 2018.

*Primary Examiner* — Nathnael Aynalem
(74) *Attorney, Agent, or Firm* — Essential Patents Group, LLP

(57) ABSTRACT

An embodiment of a semiconductor package apparatus may include technology to determine a residual error based on coding unit information, and determine a candidate coding unit and an associated rate distortion cost based on the residual error. An embodiment may additionally or alternatively include technology to partition a first coding unit into two or more smaller coding units based on a partition message, accelerate processing of at least one of the two or more smaller coding units, and estimate motion fora frame based at least partially on results of the accelerated processing. Other embodiments are disclosed and claimed.

21 Claims, 12 Drawing Sheets

(51) Int. Cl.
*H04N 19/567* (2014.01)
*H04N 19/96* (2014.01)

(58) Field of Classification Search
CPC .... H04N 19/593; H04N 19/44; H04N 19/119; H04N 19/186; H04N 19/513; H04N 19/30; H04N 19/136; H04N 19/11; H04N 19/157; H04N 19/46; H04N 19/147; H04N 19/463; H04N 19/61; H04N 19/139; H04N 19/182; H04N 19/597; H04N 19/82; H04N 19/14; H04N 19/503; H04N 19/13; H04N 19/124; H04N 19/184; H04N 19/117; H04N 19/137; H04N 19/172; H04N 19/174; H04N 19/122; H04N 19/573; H04N 19/107; H04N 19/187; H04N 19/577; H04N 19/196; H04N 19/50; H04N 19/521; H04N 19/56; H04N 19/65; H04N 13/161; H04N 19/103; H04N 19/12; H04N 19/91; H04N 19/51; H04N 13/111; H04N 19/109; H04N 19/33; H04N 19/567; H04N 19/58; H04N 19/86; H04N 13/122; H04N 13/128; H04N 19/436; H04N 19/132; H04N 19/43; H04N 19/60; H04N 19/167; H04N 19/625; H04N 19/192; H04N 19/517; H04N 19/53; H04N 19/115; H04N 19/154; H04N 19/188; H04N 19/59; H04N 19/156; H04N 19/31; H04N 19/423; H04N 19/533; H04N 19/88; H04N 19/129; H04N 19/134; H04N 19/146; H04N 19/19; H04N 19/42; H04N 19/426; H04N 19/537; H04N 19/80; H04N 19/102; H04N 19/126; H04N 19/127; H04N 19/149; H04N 19/164; H04N 19/198; H04N 19/34; H04N 19/40; H04N 19/45; H04N 19/523; H04N 19/55; H04N 19/557; H04N 19/563; H04N 19/93; H04N 19/17; H04N 19/177; H04N 19/18; H04N 19/1883; H04N 19/527; H04N 19/54; H04N 19/543; H04N 19/85; H04N 19/98; H04N 21/2343; H04N 21/4402
USPC .................................. 375/240.01–240.29
See application file for complete search history.

(56) References Cited

U.S. PATENT DOCUMENTS

| | | | |
|---|---|---|---|
| 2010/0329342 A1 | 12/2010 | Joshi et al. | |
| 2012/0230411 A1* | 9/2012 | Liu | H04N 19/70 375/E7.125 |
| 2013/0243083 A1 | 9/2013 | Sezer | |
| 2014/0015925 A1* | 1/2014 | Li | H04N 19/105 348/43 |
| 2014/0105284 A1* | 4/2014 | Lim | H04N 19/159 375/240.03 |
| 2016/0100175 A1 | 4/2016 | Laroche et al. | |
| 2016/0173906 A1* | 6/2016 | Lei | H04N 19/176 375/240.13 |
| 2018/0270480 A1* | 9/2018 | Zhang | H04N 19/154 |

* cited by examiner

| Step | Search Type | Search Direction | Bidir Blend | Anchor |
|---|---|---|---|---|
| 1 | Hpel | best | No | N\A |
| 2 | Qpel | best | No | N\A |
| 3 | Hpel | alternate | Yes | QPEL Best dir |
| 4 | Qpel | alternate | Yes | QPEL Best dir |
| 5 | Hpel | best | Yes | QPEL Alternate dir |
| 6 | Qpel | best | Yes | QPEL Alternate dir |
| 7 | Final step | Check blended Bidir vs Best UNI (Step 2 vs 4 vs 6) | | |

MODULAR MOTION ESTIMATION ENGINE FOR TREE-BASED VIDEO

CLAIM OF PRIORITY

This Application is a National Stage Entry of, and claims priority to, PCT Application No. PCT/CN2017/119809, filed on 29 Dec. 2017 and titled "MODULAR MOTION ESTIMATION ENGINE FOR TREE-BASED VIDEO", which is incorporated by reference in its entirety for all purposes.

TECHNICAL FIELD

Embodiments generally relate to graphics systems. More particularly, embodiments relate to a modular motion estimation engine for tree-based video.

BACKGROUND

When video information is transmitted, the video information may be encoded and/or compressed to reduce the transmission bandwidth. Many video encoding/compression techniques may include motion estimation. Video information may include a sequence of images processed as a series frames. Motion estimation techniques may utilize redundancy between frames to compress the video information.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Some embodiments may provide an improved architecture and techniques for performing motion estimation of media that contain multiple image frames, particularly for tree-based video. Some embodiments may particularly apply to motion estimation for video encoding, video conferencing, image stabilization, and frame rate conversion, among others. As detailed below an embodiment of a modular motion estimation engine is described that may contain modular hardware components to perform different techniques for a motion estimation of image frames such as video frames. In some embodiments, the modularity of the motion estimation hardware may provide a flexible and diverse set of techniques that may be applied to a wide variety of workloads beyond video encoding.

In some embodiments, the modular motion estimation engine may be harnessed to process an image frame via multiple parallel execution pipelines. In some embodiments, the modular motion estimation engine may alternatively, or additionally, provide a configurable architecture in which novel execution pipelines may be generated and novel operations may be performed during the motion estimation process. Such configurable architecture may allow different combinations of hardware-based motion estimation circuits to be harnessed to synthesize a given execution pipeline or combination of execution pipelines. Some embodiments may entail use of an advanced skip check engine having forward transform capabilities, hardware assisted multi-reference search support, hardware accelerated chroma intra frame prediction, hardware accelerated chroma inter frame prediction, use of weighted sum of absolute differences (SAD) procedure for true motion estimation, support for at least four predictors, support for intra directional features, and/or support for intra streamout. Some embodiments may also provide flexibility to adapt motion estimation to different workloads including image stabilization, frame rate conversion, gesture tracking, and other tasks.

Figure 1:
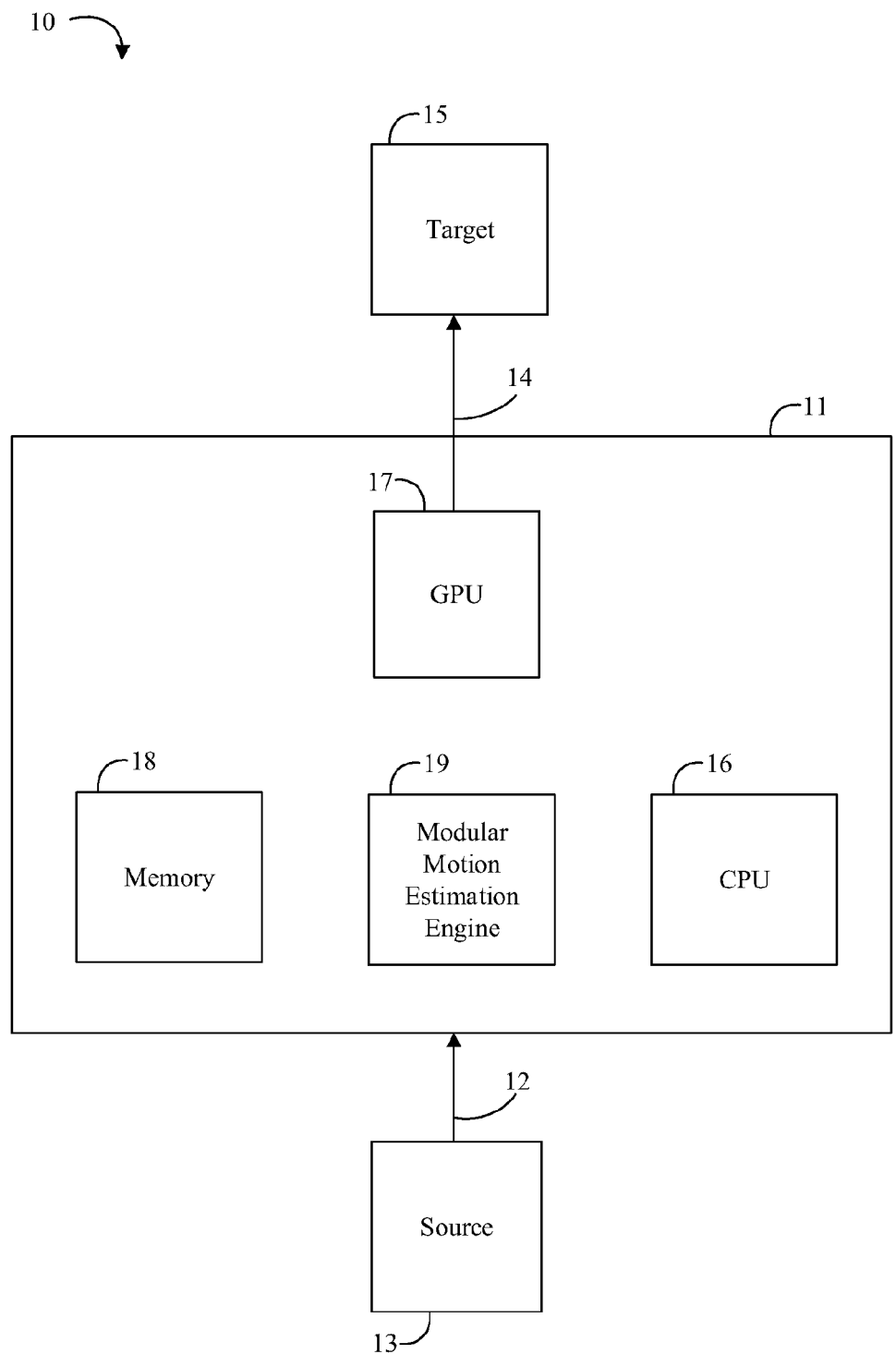
FIG. 1 is a block diagram of an example of an electronic processing system according to an embodiment.

Turning now to FIG. 1, an embodiment of an electronic processing system 10 may include an example architecture for performing motion estimation of image frames. A device 11 may receive media content 12 from a source 13 for processing. The media content 12 may be video in various embodiments, which may be processed as a series of video frames to perform motion estimation to provide processed media content 14. The device 11 may output the processed media content 14 to a target 15, which may be an external device, a digital display, or other device to consume the processed media content 14. In some embodiments of video encoding, the processed media content 14 may be encoded video.

The device 11 may include a general purpose processor (e.g., a central processor unit (CPU)) 16, a graphics processor (e.g., a graphics processor unit (GPU)) 17, and memory 18. During motion estimation, the memory 18, which may be a buffer, may receive multiple image frames of a media such as video to be processed. In some embodiments, these components and others may be embodied in a platform such as a mobile phone, smartphone, tablet computer, laptop computer or other mobile device, desktop computer, video game device, television, or hybrid communications/computing device. In some embodiments, the device 11 may be a system-on-chip (SoC) in which the components shown therein are embodied in a single semiconductor die. The embodiments are not limited in this context.

The device 11 may additionally include a modular motion estimation engine 19 (e.g., features of which may be described in more detail herein). The modular motion estimation engine 19 may process the media content 12 received by device 11 to accelerate motion estimation in a manner that is tailored to the media content 12 and/or processing requirements. For example, some embodiments may be improved or optimized for a tree-based video standard such as VP9 format (e.g., VP9 Bitstream & Decoding Process Specification, Version 0.6, published Mar. 31, 2016), high-efficiency video coding (HEVC) format (e.g., Recommendation ITU-T H.265 v4, published December 2016), multi-view HEVC format, 3D-HEVC format, etc.

For example, the modular motion estimation engine 19 may include technology to partition a first coding unit into two or more smaller coding units based on a partition message, accelerate processing of at least one of the two or more smaller coding units, and estimate motion for a frame based at least partially on results of the accelerated processing. In some embodiments, the modular motion estimation engine 19 may be further configured to provide two or more candidates for a transform unit, and select one of the two or more candidates for the transform unit based on an analysis of the two or more candidates. For example, the modular motion estimation engine 19 may also be configured to support at least four predictors for a skip engine. In some embodiments, the modular motion estimation engine 19 may be further configured to perform fractional motion estimation based on one or more of a half pel distortion mesh and a quarter pel distortion mesh. For example, the modular motion estimation engine 19 may also be configured to offload a skip engine based on a skip refinement message, and/or to return a residual to a kernel based on a residual prediction message. Some embodiments may advantageously provide a more flexible approach for motion estimation in comparison to conventional hardware-managed motion estimation that employs rigid pipelines. Some embodiments may advantageously provide improved or optimized performance for tree-based video as compared to other modular approaches for other video standards such as advanced video coding (AVC) formats.

The modular motion estimation engine 19 may include various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 2:
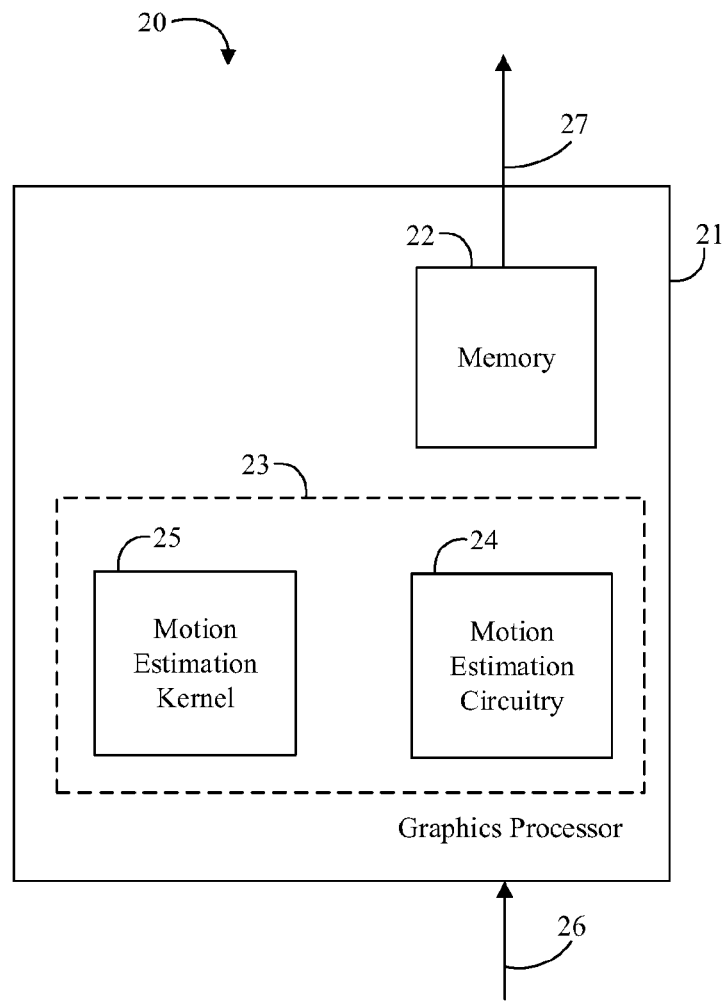
FIG. 2 is a block diagram of an example of a graphics apparatus according to an embodiment.

Turning now to FIG. 2, an embodiment of a graphics apparatus 20 may include a graphics processor 21, memory 22 communicatively coupled to the graphics processor 21, and a modular motion estimator 23 communicatively coupled to the graphics processor 21 and the memory 22. For example, the modular motion estimator 23 may be readily substituted for the modular motion estimation engine 19 (FIG. 1). The modular motion estimator 23 may include motion estimation circuitry 24, which may be located in the graphics processor 21. The modular motion estimator 23 may further include a motion estimation kernel 25 communicatively coupled to the motion estimation circuitry 24, which may act in concert with the motion estimation circuitry 24 to perform motion estimation. For example, the motion estimation circuitry 24 and the motion estimation kernel may include logic to partition a first coding unit into two or more smaller coding units based on a partition message, accelerate processing of at least one of the two or more smaller coding units, and estimate motion for a frame based at least partially on results of the accelerated processing. In some embodiments, the motion estimation kernel/circuitry logic may be further configured to provide two or more candidates for a transform unit, and select one of the two or more candidates for the transform unit based on an analysis of the two or more candidates. For example, the motion estimation kernel/circuitry logic may also be configured to support at least four predictors for a skip engine. In some embodiments, the motion estimation kernel/circuitry logic may be further configured to perform fractional motion estimation based on one or more of a half pel distortion mesh and a quarter pel distortion mesh. For example, the motion estimation kernel/circuitry logic may also be configured to offload a skip engine based on a skip refinement message, and/or to return a residual to a kernel based on a residual prediction message. In some embodiments of video encoding, the apparatus 20 may include additional circuitry such as an encoding engine that may operate on input media content 26 in conjunction with the modular motion estimator 23 to output processed media content 27 as encoded video.

Embodiments of each of the above graphics processor 21, memory 22, modular motion estimator 23, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 22, the motion estimation kernel 25, persistent storage media, or other device memory may store a set of instructions which when executed by the graphics processor 21 and/or motion estimation circuitry 24 cause the graphics apparatus 20 to implement one or more components, features, or aspects of the apparatus 20 (e.g., partitioning a first coding unit into two or more smaller coding units based on a partition message, accelerating processing of at least one of the two or more smaller coding units, estimating motion for a frame based at least partially on results of the accelerated processing, etc.).

Figure 3:
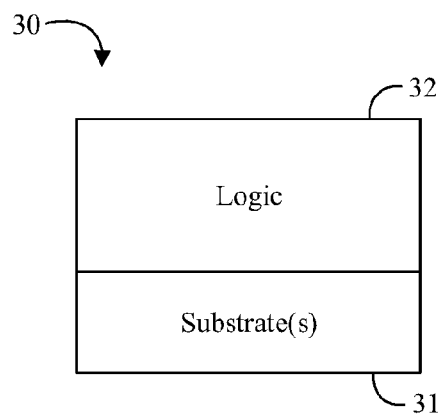
FIG. 3 is a block diagram of an example of a semiconductor package apparatus according to an embodiment.

Turning now to FIG. 3, an embodiment of a semiconductor package apparatus 30 may include one or more substrates 31, and logic 32 coupled to the one or more substrates 31, where the logic 32 is at least partly implemented in one or more of configurable logic and fixed-functionality hardware logic. The logic 32 coupled to the one or more substrates 31 may be configured to partition a first coding unit into two or more smaller coding units based on a partition message, accelerate processing of at least one of the two or more smaller coding units, and estimate motion for a frame based at least partially on results of the accelerated processing. In some embodiments, the logic 32 may be further configured to provide two or more candidates for a transform unit, and select one of the two or more candidates for the transform unit based on an analysis of the two or more candidates. For example, the logic 32 may also be configured to support at least four predictors for a skip engine. In some embodiments, the logic 32 may be further configured to perform fractional motion estimation based on one or more of a half pel distortion mesh and a quarter pel distortion mesh. For example, the logic 32 may also be configured to offload a skip engine based on a skip refinement message, and/or to return a residual to a kernel based on a residual prediction message. In some embodiments, the logic 32 coupled to the one or more substrates 31 may include transistor channel regions that are positioned within the one or more substrates.

Embodiments of logic 32, and other components of the apparatus 30, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 30 may implement one or more aspects of the method 40 (FIGS. 4A to 4C), the method 60 (FIGS. 7A to 7E), or any of the embodiments discussed herein. The illustrated apparatus 30 includes one or more substrates 31 (e.g., silicon, sapphire, gallium arsenide) and logic 32 (e.g., transistor array and other integrated circuit/IC components) coupled to the substrate(s) 31. The logic 32 may be implemented at least partly in configurable logic or fixed-functionality logic hardware. In one example, the logic 32 may include transistor channel regions that are positioned (e.g., embedded) within the substrate(s) 31. Thus, the interface between the logic 32 and the substrate(s) 31 may not be an abrupt junction. The logic 32 may also be considered to include an epitaxial layer that is grown on an initial wafer of the substrate(s) 31.

Figure 4A:
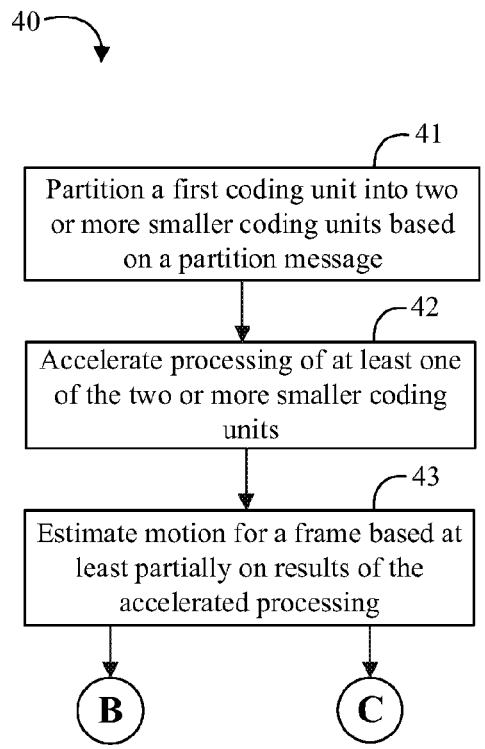
FIGS. 4A to 4C are flowcharts of an example of a method of estimating motion according to an embodiment.
Figure 4B:
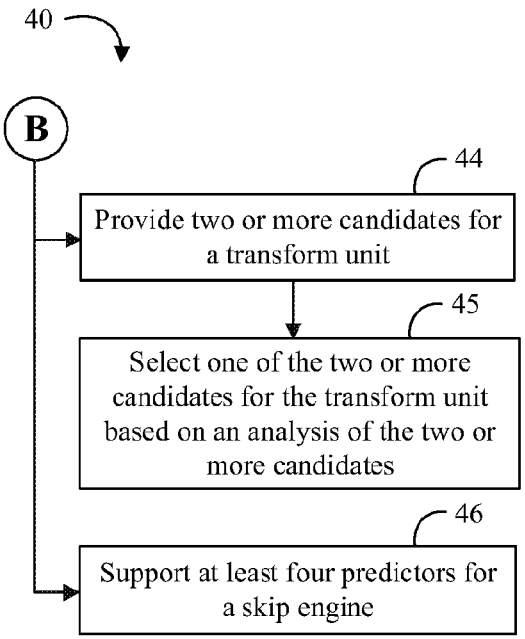
Figure 4C:
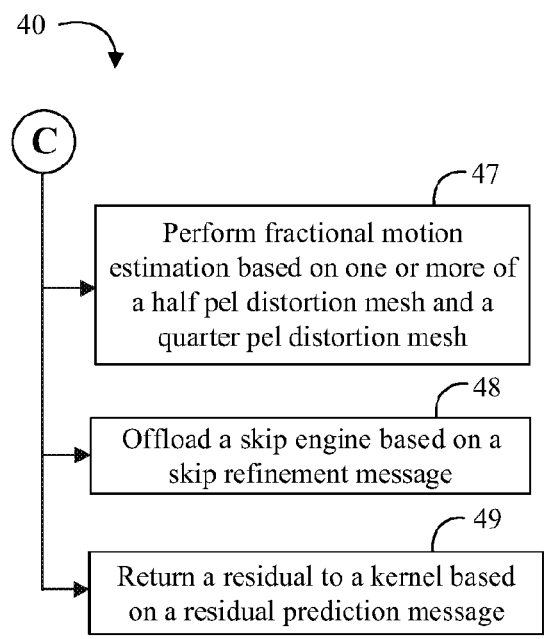

Turning now to FIGS. 4A to 4C, an embodiment of a method 40 of estimating motion may include partitioning a first coding unit into two or more smaller coding units based on a partition message at block 41, accelerating processing of at least one of the two or more smaller coding units at block 42, and estimating motion for a frame based at least partially on results of the accelerated processing at block 43. In some embodiments, the method 40 may further include providing two or more candidates for a transform unit at block 44, and selecting one of the two or more candidates for the transform unit based on an analysis of the two or more candidates at block 45. For example, the method 40 may also include supporting at least four predictors for a skip engine at block 46. Some embodiments of the method 40 may further include performing fractional motion estimation based on one or more of a half pet distortion mesh and a quarter pel distortion mesh at block 47. For example, the method 40 may also include offloading a skip engine based on a skip refinement message at block 48, and/or returning a residual to a kernel based on a residual prediction message at block 49.

Embodiments of the method 40 may be implemented in a system, apparatus, computer, device, etc., for example, such as those described herein. More particularly, hardware implementations of the method 40 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 40 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 40 may be implemented on a computer readable medium as described in connection with Examples 69 to 74 below. Embodiments or portions of the method 40 may be implemented in applications (e.g., through an application programming interface (API)) or driver software running on an operating system (OS).

Figure 5:
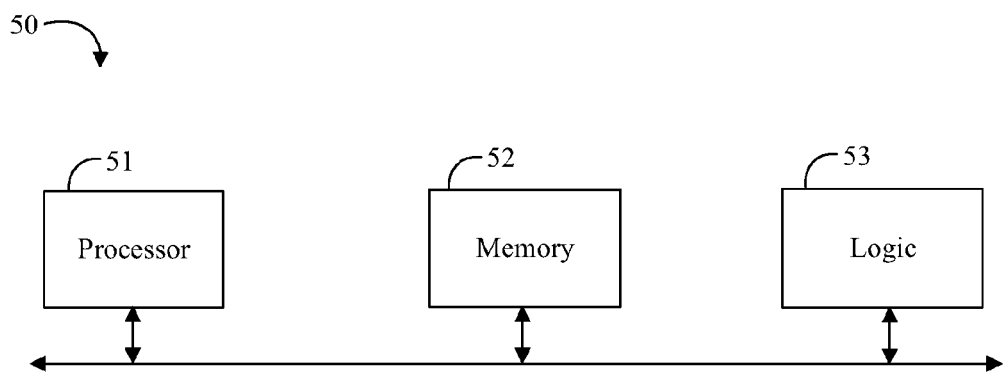
FIG. 5 is a block diagram of an example of a motion estimation system according to an embodiment.

Turning now to FIG. 5, an embodiment of a motion estimation system 50 may include a processor 51, memory 52 communicatively coupled to the processor 51, and logic 53 communicatively coupled to the processor 51 to determine a residual error based on coding unit (CU) information, and determine a candidate CU and an associated rate distortion (RD) cost based on the residual error. In some embodiments, the logic 53 may be further configured to determine the residual error based on the CU information and a merge list, determine merge information based on a zero coding bit factor (CBF), and determine the candidate CU, the associated RD cost, and edge pixel information based on the residual error and the merge information. In some embodiments, the logic 53 may be further configured to determine the residual error based on the CU information and one or more of a fractional motion estimate and a bidirectional motion estimate, determine inter-frame information based on a zero CBF, and determine the candidate CU, the associated RD cost, and edge pixel information based on the residual error and the inter-frame information. For example, the logic 53 may also be configured to determine one or more of the fractional motion estimate and the bidirectional motion estimate based on a depth first search (DFS) and a breadth first search (BFS). In some embodiments, the logic 53 may be further configured to determine the residual error based on the CU information and an intra-frame mode search with reconstructed neighbor pixel information, determine intra-frame information based on a zero CBF, and determine the candidate CU, the associated RD cost, and edge pixel information based on the residual error and the intra-frame information. For example, the logic 53 may also be configured to perform an integer motion search based on another set of CU information, determine partition unit candidates based on the integer motion search, and determine another candidate CU based on the partition unit candidates.

Embodiments of each of the above processor 51, memory 52, logic 53, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C # or the like and conventional procedural programming languages, such as the "C" programming language or similar programming languages. For example, the memory 52, persistent storage media, or other device memory may store a set of instructions which when executed by the processor 51 and/or motion estimation circuitry cause the system 50 to implement one or more components, features, or aspects of the system 50 (e.g., determining a residual error based on CU information, determining a candidate CU and an associated RD cost based on the residual error, etc.).

Figure 6:
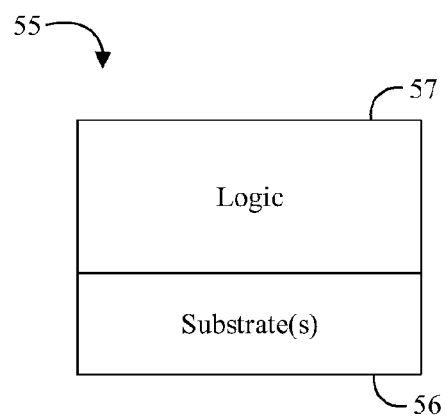
FIG. 6 is a block diagram of another example of a semiconductor package apparatus according to an embodiment.
Figure 7A:
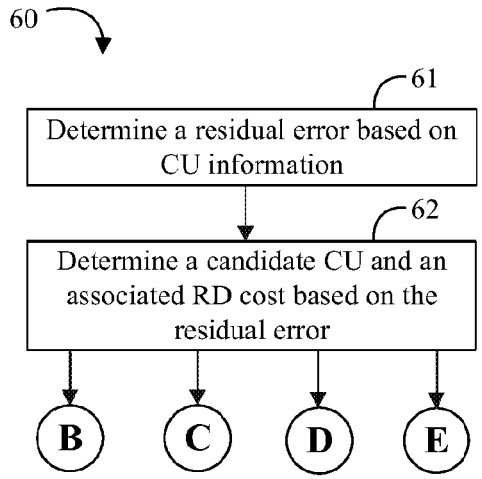
FIGS. 7A to 7E are flowcharts of another example of a method of estimating motion according to an embodiment.
Figure 7B:
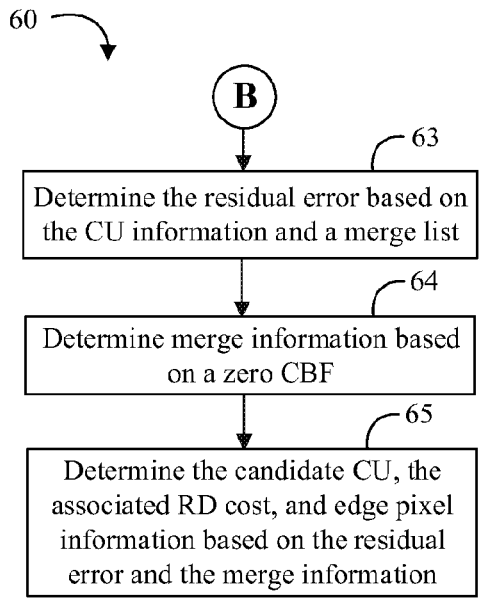
Figure 7C:
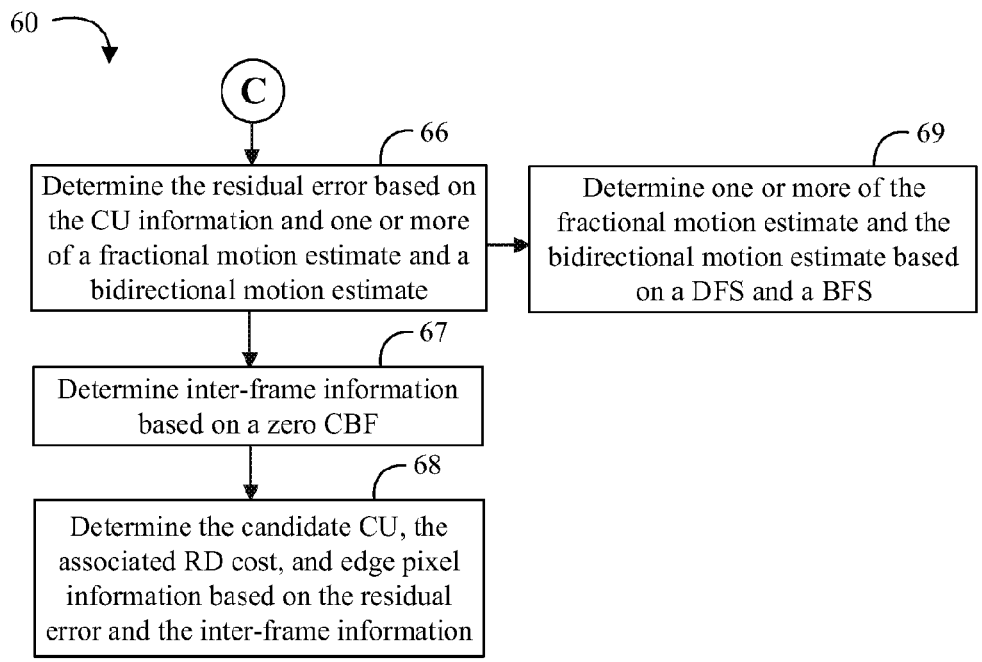
Figure 7D:
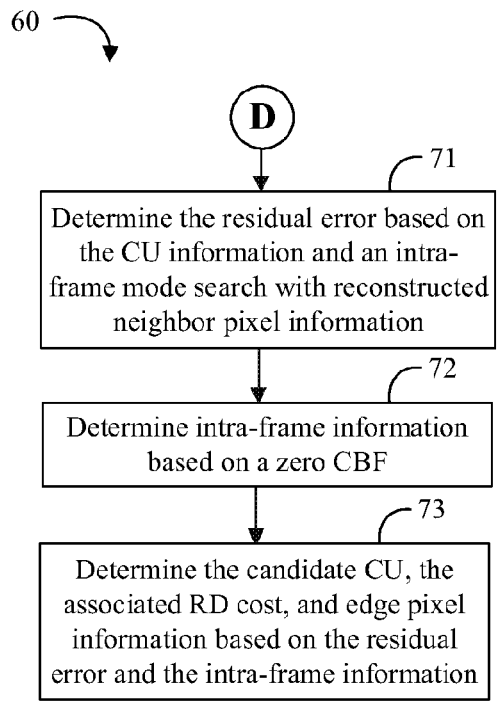
Figure 7E:
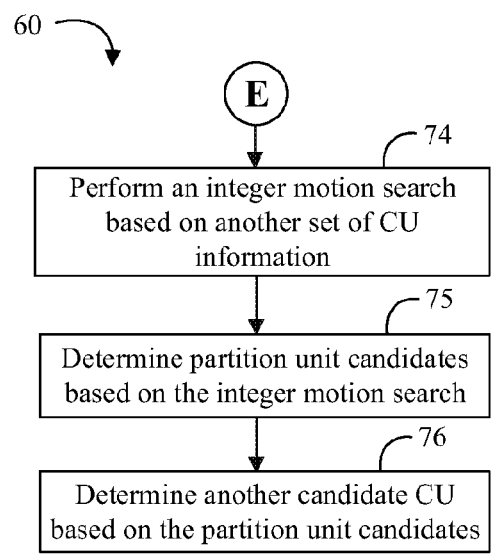

Turning now to FIG. 6, an embodiment of a semiconductor package apparatus 55 may include one or more substrates 56, and logic 57 coupled to the one or more substrates 56, where the logic 57 is at least partly implemented in one or more of configurable logic and fixed-functionality hardware logic. The logic 57 coupled to the one or more substrates 56 may be configured to determine a residual error based on CU information, and determine a candidate CU and an associated RD cost based on the residual error. In some embodiments, the logic 57 may be further configured to determine the residual error based on the CU information and a merge list, determine merge information based on a zero CBF, and determine the candidate CU, the associated RD cost, and edge pixel information based on the residual error and the merge information. In some embodiments, the logic 57 may be further configured to determine the residual error based on the CU information and one or more of a fractional motion estimate and a bidirectional motion estimate, determine inter-frame information based on a zero CBF, and determine the candidate CU, the associated RD cost, and edge pixel information based on the residual error and the inter-frame information. For example, the logic 57 may also be configured to determine one or more of the fractional motion estimate and the bidirectional motion estimate based on a DFS and a BFS. In some embodiments, the logic 57 may be further configured to determine the residual error based on the CU information and an intra-frame mode search with reconstructed neighbor pixel information, determine intra-frame information based on a zero CBF, and determine the candidate CU, the associated RD cost, and edge pixel information based on the residual error and the intra-frame information. For example, the logic 57 may also be configured to perform an integer motion search based on another set of CU information, determine partition unit candidates based on the integer motion search, and determine another candidate CU based on the partition unit candidates. In some embodiments, the logic 57 coupled to the one or more substrates 56 may include transistor channel regions that are positioned within the one or more substrates.

Embodiments of logic 57, and other components of the apparatus 55, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

The apparatus 55 may implement one or more aspects of the method 40 (FIGS. 4A to 4C), the method 60 (FIGS. 7A to 7E), or any of the embodiments discussed herein. The illustrated apparatus 55 includes one or more substrates 56 (e.g., silicon, sapphire, gallium arsenide) and logic 57 (e.g., transistor array and other integrated circuit/IC components) coupled to the substrate(s) 56. The logic 57 may be implemented at least partly in configurable logic or fixed-functionality logic hardware. In one example, the logic 57 may include transistor channel regions that are positioned (e.g., embedded) within the substrate(s) 56. Thus, the interface between the logic 57 and the substrate(s) 56 may not be an abrupt junction. The logic 57 may also be considered to include an epitaxial layer that is grown on an initial wafer of the substrate(s) 56.

Turning now to FIGS. 7A to 7E, an embodiment of a method 60 of estimating motion may include determining a residual error based on CU information at block 61, and determining a candidate CU and an associated RD cost based on the residual error at block 62. Some embodiments of the method 60 may further include determining the residual error based on the CU information and a merge list at block 63, determining merge information based on a zero CBF at block 64, and determining the candidate CU, the associated RD cost, and edge pixel information based on the residual error and the merge information at block 65. Some embodiments of the method 60 may further include determining the residual error based on the CU information and one or more of a fractional motion estimate and a bidirectional motion estimate at block 66, determining inter-frame information based on a zero CBF at block 67, and determining the candidate CU, the associated RD cost, and edge pixel information based on the residual error and the inter-frame information at block 68. For example, the method 60 may also include determining one or more of the fractional motion estimate and the bidirectional motion estimate based on a DFS and a BFS at block 69.

Some embodiments of the method 60 may further include determining the residual error based on the CU information and an intra-frame mode search with reconstructed neighbor pixel information at block 71, determining intra-frame information based on a zero CBF at block 72, and determining the candidate CU, the associated RD cost, and edge pixel information based on the residual error and the intra-frame information at block 73. For example, the method 60 may also include performing an integer motion search based on another set of CU information at block 74, determining partition unit candidates based on the integer motion search at block 75, and determining another candidate CU based on the partition unit candidates at block 76.

Embodiments of the method 60 may be implemented in a system, apparatus, computer, device, etc., for example, such as those described herein. More particularly, hardware implementations of the method 60 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 60 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

For example, the method 60 may be implemented on a computer readable medium as described in connection with Examples 20 to 25 below. Embodiments or portions of the method 60 may be implemented in firmware, applications (e.g., through an application programming interface (API)), or driver software running on an operating system (OS).

Some embodiments may advantageously provide modular motion estimation and mode decision for tree-based video formats. For example, some embodiments may provide a set of features for advanced video encoding in hardware, optimized for a HEVC and/or a VP9 class of video formats. There are numerous issues that must be addressed in hardware encoders such as cost, complexity, flexibility and performance which must be balanced with achieving high video fidelity with the lowest bitrate encoded bitstream. Some embodiments may advantageously provide high quality together with substantial software programmability.

Other systems may re-purpose a AVC-based encoder to encode HEVC and/or VP9. However, compression and performance may both be sacrificed when using an AVC-based video motion estimation because the encoder may not be well-suited for coding, partition, and/or transform unit trees. Some embodiments may provide a video motion estimator (VME) with a modular motion estimation engine inside of the graphics processor/GPU optimized for tree-based video. In some embodiments, the VME may be based on atomic messages that do specific checks or searches within a larger encoder technique network, allowing various networks to be created which can be tailored for performance or quality.

Some embodiments may include a hardware engine that delivers both high accuracy and high-performance computations as a co-processor to deliver high quality while still allowing for flexible software implementations. As opposed to a fixed function encoder that has its encoder flow defined in hardware, some embodiments of a modular motion estimation engine may be at the core of numerous different encoder mode decision networks. As opposed to a pure software encoder that doesn't have any co-processor to offload critical functions such as motion estimation or rate distortion optimization computations, some embodiments may include a hardware co-processor/accelerator to offload computations. Advantageously, some embodiments may provide the performance of a fixed function encoder with the programmability of a software encoder. For a non-HEVC VME workload, some embodiments of a VME may be backwards compatible with one or more non-HEVC formats at the binary level for input and output, with performance largely unaffected.

Some differences between HEVC and AVC may include different partition/coding unit sizes (e.g., which may exceed 16×16 in HEVC), the transform unit decision (e.g., for HEVC the VME may need to include a forward transform in partitioning logic), and intra may have considerably more prediction modes in HEVC as compared to AVC (e.g., 35 vs. 9). Advantageously, some embodiments may be configurable to manage these differences in software/hardware to support AVC while providing improved performance for HEVC (e.g., or other tree-based video formats). For example, some embodiments may be programmable to optimize for power, performance, and quality for tree-based video formats.

Figure 8:
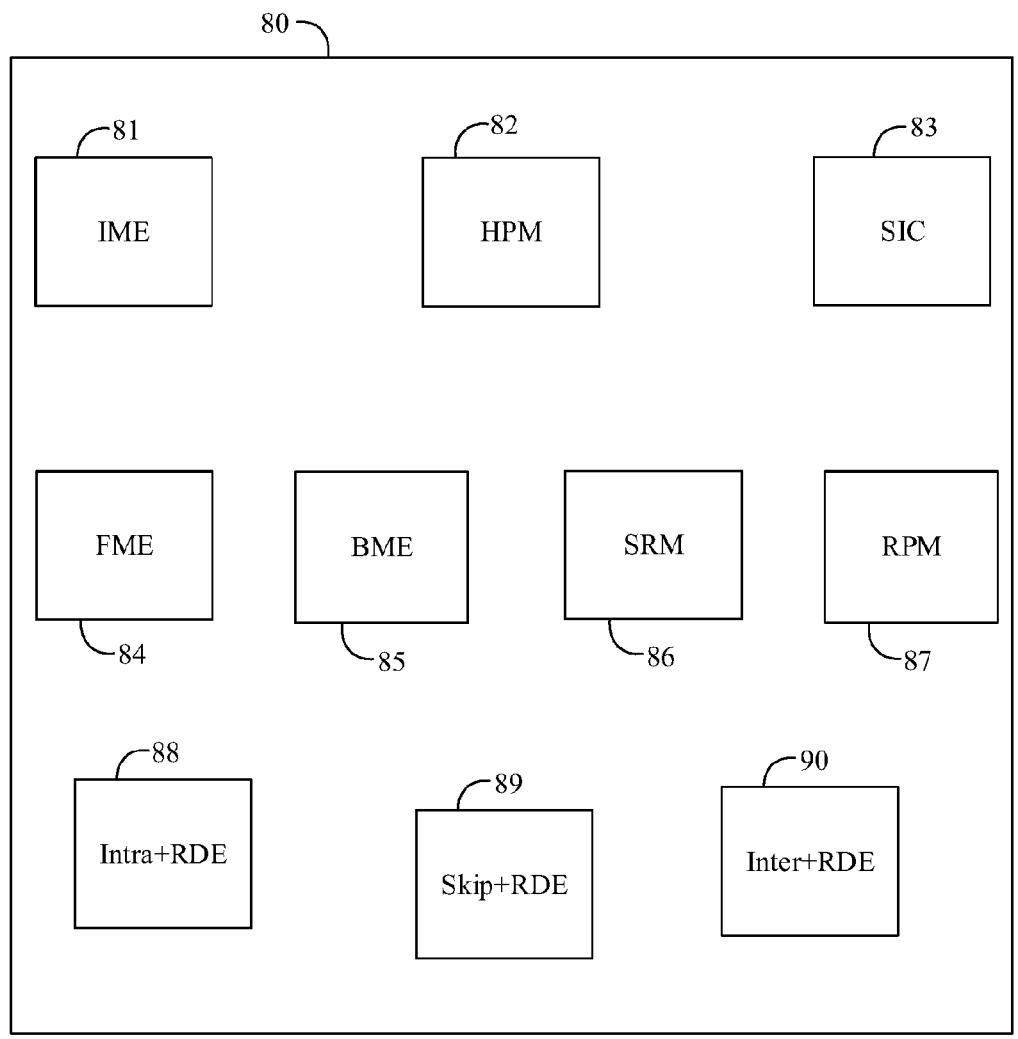
FIG. 8 is a block diagram of an example of modular motion estimator apparatus according to an embodiment.

Turning now to FIG. 8, an embodiment of a modular motion estimator 80 may be logically or physically organized as one or more modules. For example, the modular motion estimator 80 may include an integer motion estimation (IME) module 81, a hierarchical partition message (HPM) module 82, a skip intra check (SIC) module 83, a fractional motion estimation (FME) module 84, a bi-directional motion estimation (BME) module 85, a skip refinement message (SRM) module 86, a residual prediction message (RPM) module 87, an intra plus rate distortion estimation (intra+RDE) module 88, a skip+RDE module 89, and an inter+RDE module 90. The IME 81 may include an increased source size and reference window storage. The IME 81 may also include increased shape sizes in the record and may expand streamout (e.g., 49 shapes). The HPM 82 may be configured to process a partition message to offload the IME 81 from the partitioning duties to support coding unit (CU), prediction unit (PU), and/or transform unit (TU) decisions for the tree-based video format. The SIC 83 may include an increased source size and reference window storage. The SIC 83 may also support up to four (4) predictors in one call derived internally by the VME, or four predictors explicitly provided by the kernel. The SIC 83 may also support intra directional filters, and may also support intra streamout. The FME 84 may include an increased source size and reference window storage. The FME 84 may also be based on a half pel (Hpel) and/or a quarter pel (Qpel) distortion mesh. The BME 85 may include an increased source size and reference window storage. The SRM 86 may help to offload the SIC 83 for skip replacement of CU's as a final stage of a mode decision. The RPM 87 may help to replace forward transform by returning a residual to the kernel for additional processing.

In some embodiments of the modular motion estimator 80, the skip+RDE 89 may perform one or more of merge and skip residual error analysis on a first coding unit packet and determine a best merge candidate coding unit and a first rate distortion optimization cost based on the analysis. The IME 81 may perform integer motion estimation on second coding unit packet and determine a best partition candidate coding unit and a second rate distortion optimization cost based on the partition candidates. The inter+RDE 90 may perform fractional and bidirectional motion estimation residual error analysis on a third coding unit packet and determine a best inter candidate coding unit and a third rate distortion optimization cost based on the analysis. The intra+RDE 88 may perform an intra mode search residual error analysis on a fourth coding unit packet and determine a best intra candidate coding unit and a fourth rate distortion optimization cost based on the analysis. For example, a kernel/control logic may control a process flow to construct the coding unit packets based on the best candidate coding unit information received from the modules.

Embodiments of the IME 81, the HPM 82, the SIC 83, FME 84, BME 85, SRM 86, RPM 87, intra+RDE 88, skip+RDE 89, inter+RDE 90, and other components of the modular motion estimator 80, may be implemented in hardware, software, or any combination thereof. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

IME Examples

Some embodiments may decouple the CUs and PUs and provide an increased maximum size and division for a given CU. In some embodiments, inter and intra frames may be mixed together within the block type along with a number of ways to sub-divide blocks into different shape sizes. For example, the largest CU (LCU) for H.265 v4 may be as large as 64×64 pixels (e.g., 16 times more pixels than AVC's 16×16 macroblock). The LCU may be divided into quarter elements through a process of quad-tree division. The encoder may choose to subdivide the LCU into four 32×32 blocks. Each of these 32×32 CUs may be further split into smaller CUs (e.g., four 16×16 CUs) or may maintain their current size (one 32×32 CU). The process may continue to subdivide into smaller CUs (e.g., four 8×8 CUs) or may main their current size (one 16×16 CU). Some embodiments may specify a maximum depth at which an LCU can be divided (e.g., up to 4 times). The encoder may be configured to honor the specified depth.

Figure 9:
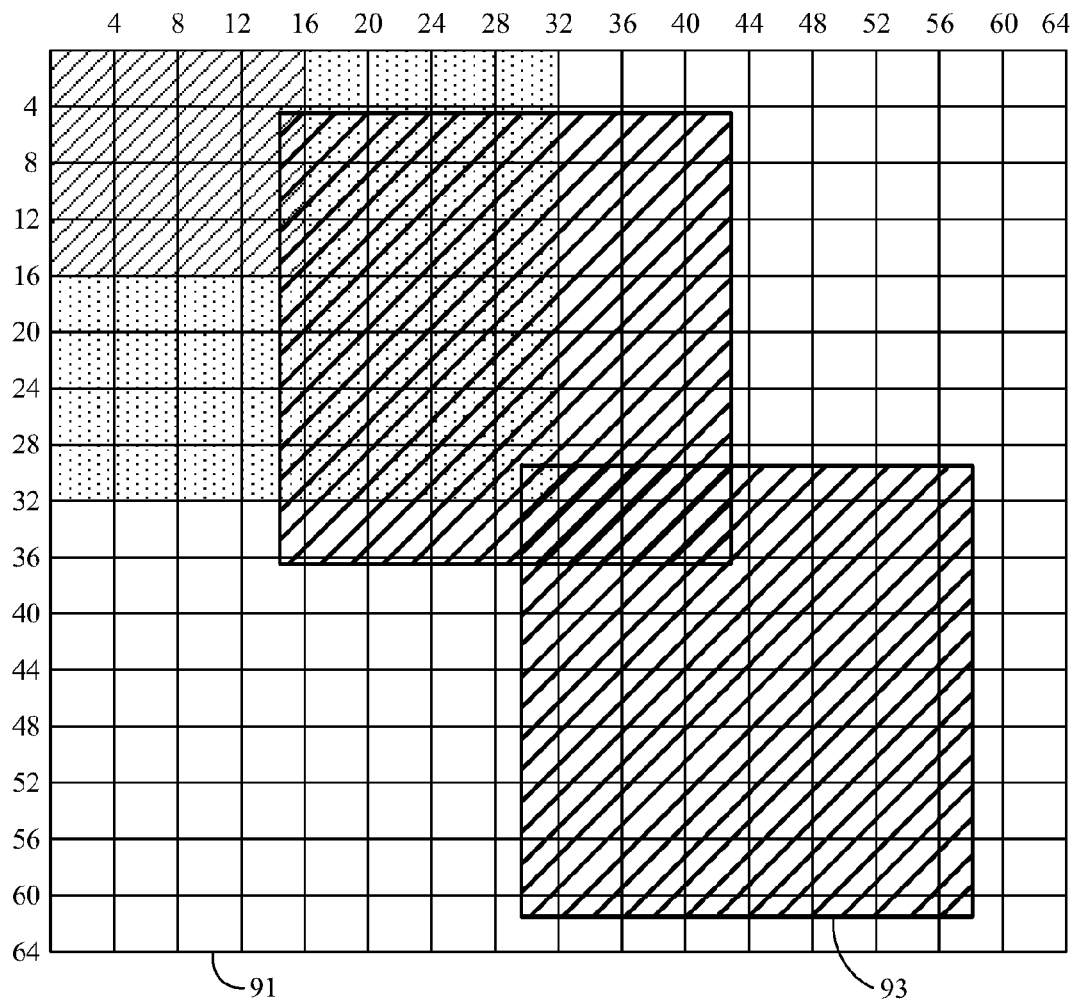
FIG. 9 is an illustrative diagram of an example of a reference window according to an embodiment.

Turning now to FIG. 9, an embodiment of a HEVC-based VME may support a 64×64 reference window 91 with a 32×32 search range 93 (e.g., a 32×32 source size) for a total of 1024 search points (e.g., 64 search units). Some embodiments may increase the reference window storage to accommodate a larger source size maintaining a reasonable search range per call. Some embodiments may refer to the larger reference window 91 as a big window mode. Some embodiments may reduce the number of candidates to a few to reduce complexity while still supporting performance optimized reference window choices. For example, some embodiments of a HEVC-based VME may also support a 48×48 reference window with a 16×16 search range for a total of 256 search points (e.g., 16 search units), and also a 48×40 reference window with a 16×8 search range (e.g., 8 search units). These smaller window modes may load a lower number of cache lines as compared to the big window mode.

In some embodiments, if a smaller source size (e.g., a 16×16 source size) is selected, the sizes allowed may likewise be restricted such that the number of search units does not exceed a maximum number (e.g., 64) that is supported by the VME. The big window mode may support search path controls and/or adaptive searching. In some embodiments, for a 32×32 source size adaptive search may key off of 16×16 shape distortions instead of 8×8 shape distortions. Some embodiments of a HEVC-based VME may include many more shapes because of the CU and PU combinations supported. The IME may only support a subset of the shapes based on simulation results for the most beneficial candidates. For example, the IME may support 49 shapes for a 32×32 source size including one 32×32, two 32×16, two 16×32, four 16×16, 32×8_T, 32×8_B, 32×24_T, 32×24_B, 8×32_L, 8×32_R, 24×32_L, 24×32_R, eight 16×8, eight 8×16, and sixteen 8×8, where T corresponds to top, B corresponds to bottom, L corresponds to left, and R corresponds to right. Other standards may have similar shape structures with different nomenclature. In some embodiments, shapes below 8×8 (e.g., 32 8×4, 32 4×8, and 64 4×4) may not be supported for lack of benefit to HD and above content resolutions and because of the large number of such shapes (e.g., another 128 shapes). Additionally, some embodiments may not support the asymmetrical candidates for the 16×16 level (e.g., 16×4, 4×16, 12×16, 16×12) because the benefit may be reduced as compared to the 32×32 level versions and the large number of such shapes (e.g., another 64 shapes).

HPM Examples

In some embodiments, each choice to split a CU into quarter elements may be represented by one (1) bit which indicates to split or to not split. If a CU is split, another 4 bits may be used to represent if each smaller CU is also split, and so-on. The split process creates a quad-tree that may efficiently describe the structure of a LCU, The VME may decide which and how many splits are performed to reduce or minimize the bits to compress the current LCU.

In some embodiments, each CU may be coded as inter, intra or skip, which may be referred to as the PU. Each PU may also contain a PU split. The PU split options may be different for each PU type. For example, the skip type may have no split options, while the intra type may have 2 split options including 2N×2N or N×N, where N corresponds to a nominal block size (e.g., 2, 4, 8, etc.). The 2N×2N case may have only one prediction mode where the N×N case may have four prediction modes for each N×N block. The inter type may have many more options. For example, eight options may include 2N×2N, 2N×N, N×2N, N×N, 2N×nD, 2N'3nU, nL×2N, and nR×2N, where U corresponds to an up portion and D corresponds to a down portion for blocks that are non-square in nature. The last four options may correspond to 4:1 aspect ratio shapes (e.g., where n is half of N).

The number of legal combinations of CU and PU may exceed a million combinations. Including the prediction modes within each PU and all legal motion vector candidates for inter MB's further increases the complexity. A programmable TU decision may also increase the complexity for some tree-based standards. For HEVC, for example, 32×32, 16×16, 8×8 and 4×4 may all be candidate TU options. The TU decisions may be independent from PU choices, but cannot exceed the size of the CU in which they reside. The VME may need to make the right CU and TU choice collectively. Advantageously, some embodiments of modular motion estimator may provide a fast and intelligent VME to make the needed decisions in a correct and timely manner.

In some embodiments, partitioning logic may decide the best subdivision from larger coding elements into smaller ones, taking into account the overhead associated with additional syntax in the bitstream to describe these smaller coding elements. Some tree-based video formats may be too complex to handle the partitioning decision inside the IME message. Some embodiments of a HEVC-based VME may include a partition message called HPM which indicates the CU, PU and TU decision responsibility. The HPM may be indicate such responsibility for these decisions only up to a specified CU level (e.g., up to a 32×32 CU level). In some embodiments, if necessary, 64×64 CU and PU decisions may be the responsibility of the kernel (e.g., where there may be only a handful of legal candidate options to consider).

The inputs to the HPM may be stream-in data from the IME containing a number (e.g., 49) of unique inter shapes for all of the CUs and PUs supported by the IME along with the stream-in data from a number (e.g., 21) of unique intra shapes supported by the SIC. An additional number (e.g., 49) of inter shapes may be input in the case of bi-directional partitioning. The outputs of the HPM may include multiple partitioning candidates which are described by respective CU and PU types and splits.

In some embodiments, the TU decision may not be made inside the HPM because of performance and complexity surrounding the decision. For example, the HPM may instead provide multiple candidates, where each candidate is optimized for different potential maximum TU sizes. The kernel may then inspect the TU-based candidates and identify if one is clearly best or if further analysis is required to make the TU decision. If further analysis is required, a check and refine motion estimation (CRE) engine may support a forward transform (e.g., a HEVC compliant forward transform) up to 32×32 which may be used to compare different CU and PU combinations given different TU candidates. The best TU candidate may then be selected based on the comparison.

SIC Examples

The reference window and/or source size for the SIC may be increased similar to as discussed above for the IME. In some embodiments, HEVC-based predicted motion vector (PMV) calculations may be performed by the VME. Having the PMV calculations performed by the VME may improve cost center generation during the HPM message processing, may compare all the merge mode candidate predictors versus the motion vectors (MVs) similar to the bitstream packer behavior to improve mode decision, and/or may reduce complexity for 16×16 and 8×8 skip replacements. Other VME systems may have to process skip replacements in the kernel because of a dependency on the MV calculation post skip replacement for the previous block.

For example, when the SIC is called, no (0) predictors may be sent to the SOC and the CRE may calculate all the necessary MVs and fetch the data accordingly. All the predictors may be returned back to the kernel for future IME cost calculations. Later, the HPM may regenerate the predictors during partitioning to optimize the mode decision (e.g., after subtracting the MV cost added previously by the IME from the pseudo cost centers used during search). For example, HEVC may have defined a number (e.g., 35) different predictors and the HEVC-based VME may support all of them. All of the predictors may be available to every different CU size in some embodiments. In some embodiments, to minimize the change to an HEVC-based VME while still obtaining a coding gain for HEVC over non-HEVC encoder, the width of the data path for the HEVC-based VME may remain 9 but 35 different interpolation configurations may be supported.

FME Examples

The reference window and/or source size for the FME may be increased similar to as discussed above for the IME. In some embodiments, an HEVC-based VME may process Hpel and Qpel decisions in a greedy fashion in the same call, first identifying the best Hpel result followed by the 8 Qpel locations around that Hpel result for all CU and PU candidates. The FME may support fractional search for 64×64 PUs without increasing the source size to 64×64. For example, the FME may call a fractional/bi-directional prediction (FBR) module four (4) times for each 32×32 block of the 64×64 window and return the eight (8) Hpel distortions for each one in 3×3 distortion mesh. The kernel may then add the 3×3 meshes and identify the best Hpel candidate (e.g., or an integer candidate). The kernel may then call the FBR again four (4) times to generate four (4) 3×3 Qpel meshes. The kernel may then add the 3×3 Qpel meshes and identify the best Qpel candidate (e.g., or a center candidate). For example, the FME mesh may only be an option for a PU of 32×32 and may perform only Hpel or Qpel.

SRM Examples

A skip replacement message may be utilized when a given CU tree is refined but not yet considered for skip/merge candidate replacements. For example, the SRM may identify potential skip replacements which may result in better compression. Some embodiments may utilize the SRM when the skip analysis cannot be performed in-loop with the other rate distortion optimization (RDO) decisions and the skip analysis may be checked as a final step rather than in sequence with other decision stages.

RPM Examples

A residual prediction message may produce the residual error between the source and a given predicted block (e.g., either by inter or intra prediction). The residual error may then be analyzed (e.g., by a SW kernel) for RDO following a forward transform and quantization operation. The residual may also be analyzed for subjective quality enhancement for different transform unit coding options.

Other Examples

Figure 10:
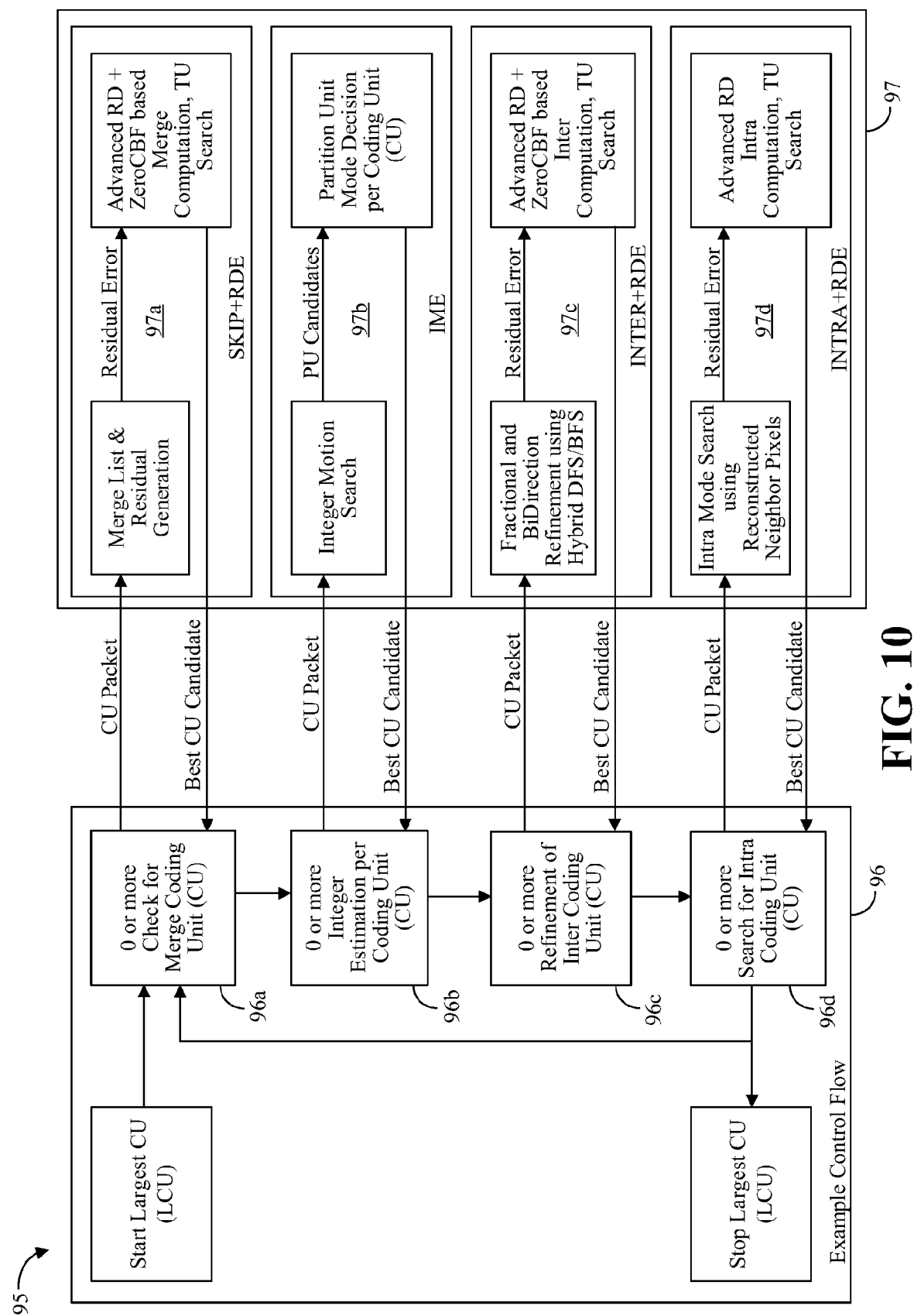
FIG. 10 is an illustrative diagram of an example of a coding unit selection process flow according to an embodiment.

Turning now to FIG. 10, an embodiment of a process flow 95 between a software (SW) component 96 (e.g., a motion estimation kernel) and a hardware (HW) component 97 (e.g., motion estimation circuitry) may include an example control flow from the SW component 96 to exchange evolved messages with the HW component 97 to provide advanced quality and performance. The example control flow of the SW component 96 may include a loop for a given largest coding unit (LCU) which may work either tops-down or bottoms-up to subdivide the coding unit into improved or optimal coding structures. The SW component 96 may first consider the skip/merge prediction type at block 96a by calling the VME skip+RDE message to provide a CU packet to the skip+RDE module 97a, which may return the best merge candidate CU along with the associated RDO cost and reconstructed edge pixels. Based on that result, the SW component 96 may then consider integer motion estimation at block 96b via an IME call to provide another CU packet to the IME module 97b, which may return a large number of shapes with optimal motion vectors to the SW component 96. The SW component 96 may then consider refinement of inter CU at block 96c via an inter+RDE message to provide another CU packet to the inter+RDE module 97c. The inter+RDE module 97c may refine the CUs by performing fractional motion estimation and/or bidirectional motion estimation with the refined motion vector and may return the best CU candidates along with the associated RDO to the SW component 96. Based on that result, the SW component 96 may perform an RDO comparison with the best identified merge candidate CU. The SW component 96 may also consider a search for intra CU at block 96d via an intra+RDE message to provide another CU packet to the intra+RDE module 97d. The intra+RDE module 97d may perform an intra angular prediction analysis which may consume the reconstructed edge pixels of all neighbors and return an intra candidate coding unit for the best identified intra angle (e.g., or DC, planar, etc.) along with the RDO cost of the winner to the SW component 96.

Some embodiments may provide one set of RD costs per merge candidate (e.g., as opposed to one set of skip and merge mode costs for all 4 merge candidates). For example, all additional costs may be programmed as a part of the rate distortion estimation (RDE) cost message. Providing one set of RD costs per merge candidate may advantageously provide the encoder flexibility to tune the content for different resolutions with different cost configurations to get better compression (e.g., an average compression gain of 4% in high quantization parameter (QP) cases for class A/B/E).

Some or all of these messages may also perform a transform unit (TU) size analysis and return that information in the candidate CU record. Based on the RDO comparison with the best inter, intra and skip, the SW component 96 may identify the best prediction unit (PU) and TU at that CU level. The SW component 96 may then step up or step down a CU level and produce the best combination of CU that may be grouped together to compete with a single CU of a larger size, up to that of the LCU.

In some embodiments, the inter+RDE and skip+RDE messages may utilize up to the full tap width filter interpolation (e.g., 8-tap or as specified for a given video standard) or any smaller filter tap width to save gate count. All message types may be performed as luma channel only, chroma channel only, or both luma and chroma channel distortions combined (e.g., with or without a weighting). In some embodiments, all computations may be performed up to the full bit-depth of each channel or a reduced bit-depth.

In some embodiments, the input surface formats for both source and reference pictures may have their UV planes interleaved. The CRE may process the U pixels followed by the V pixels when accumulating the distortions. For example, the chroma may require two passes in the RDE pipeline. The chroma RDE may be performed for all the TU depths that are supported for the luma RDE. For example, the TU decision may be made with luma+chroma RD distortions when the chroma RDE check is enabled. Additional chroma reconstructed neighbor pixels may be output from the CRE back to the encoder similar to how the luma reconstructed pixels are generated.

In some embodiments, the SW component 96 may provide a CU packet to the HW component 97. In general, the CU packet may contain information which is useful or necessary for the HW component 97 to perform the requested processing. The CU packet may include technology and/or a structure for communication between a motion estimation kernel and motion estimation circuity which is consistent with a bitstream packer and may completely describe a given coding block's syntax elements.

For example, the CU packet may contain a superset of PU and TU information that a given CU may contain. The CU packet may contain the CU size (e.g., 8×8 thru 64×64), up to two motion vector (MV) pairs for two bidirectional PUs along with their reference IDs, PU shapes, TU split depth, luma and chroma intra prediction angles, and the quantization parameter (QP) to be used in the forward and inverse quantization step of RDE processing. A CU packet may be provided to the VME and the VME may optimize the provided information to improve the coding efficiency, returning the improved CU packet back to the control logic (e.g., the kernel). The RDO cost may also be provided back to the control logic for a final mode decision. The selected best CU packet for a given pixel region may eventually be sent to the bitstream packer to produce the final bitstream. In some embodiments, the CU packet may be implemented with a 256 byte packet including fields for one or more of a CU QP (quantization parameter for RDE), a CU Skip Flag (skip, not skip), MV0 and MV1 direction (forward, backward, or bidirectional), CU prediction mode (inter, intra), CU partition Mode (8 of them . . . 2N×2N, 2N×N, N×2N, N×N . . . ), chroma intra mode, CU Size (8×8, 16×16, 32×32, 64×64), luma intra Mode (35 different angles, etc.), CU offset within an LCU, TU split depth, MV0 and MV1 reference ID, and motion vector list 0 (e.g., L0 MV0 and MV1) and motion vector list 1 (e.g., L1 MV0 and MV1).

Some embodiments may differ from a six message type case where SRM, HPM and RPM are no longer utilized. In the process flow 95, for example, rate distortion optimization (RDO) which may previously have been handled by RPM and EU processing may instead be performed by the HW component 97 based on the core message type (e.g., inter, intra, skip, etc.), which may be considered a combination message. With appropriate setup of the SW component 96, neither SRM nor HPM may be necessary. The RDO mode decision may be made from a bottoms-up flow, selecting the best PU and TU for each CU along the way, considering skip/merges. In the process flow 95, for example, HPM may be redundant because the partitioning may also be handled during the bottoms-up flow by comparing the best sub-partition versus the current partition level. Advantageously, the four message types skip+RDE, IME, inter+RDE, and intra+RDE may provide fundamental building block technology for most motion estimation applications (e.g., as a subset of the 10 message types indicated in FIG. 8). The three combination message types (skip+RDE, inter+RDE, intra+RDE), the IME message types, and the other six message types are all useful for different applications. Depending on the application, not all of the message types shown may be available in the VME and/or some message types may be implemented in a dedicated hardware module while others may be implemented in a RPM style and may rely on a graphics processor unit (GPU) or digital signal processor (DSP) to perform the RDO analysis based on the RPM output.

Figures 11, 12:
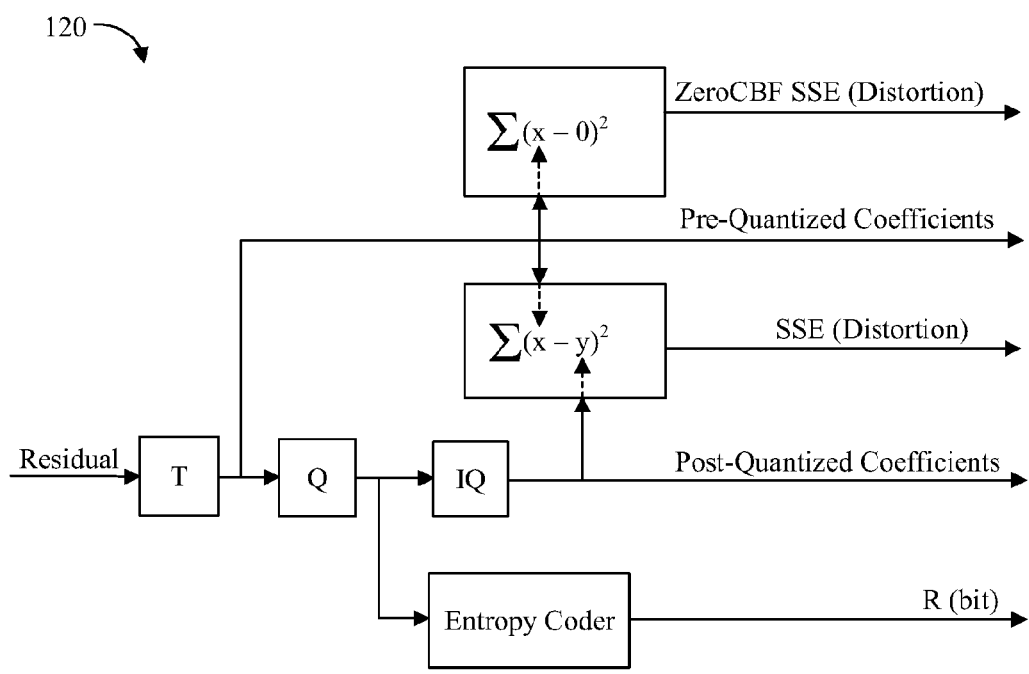
FIG. 11 is an illustrative table of an example of hybrid depth first search (DFS)/breadth first search (BFS) according to an example.
FIG. 12 is an illustrative diagram of an example of a rate distortion and zero coding bit factor (CBF) computation according to an embodiment.

Turning now to FIG. 11, an embodiment of a hybrid depth first search (DFS)/breadth first search (BFS) may be based on a search type, a search direction, a bi-directional blend, and an anchor. The table in FIG. 11 shows an example of the sequencing of a combined local fractional motion estimation (FME) and bidirectional motion estimation (BME). In a first case, the best direction's integer motion vector may be greedily optimized to its finest precision (e.g., a quarter pel (Qpel)) before combining with the alternate direction. After the best direction's motion vector is optimized to Qpel, the alternate direction FME search occurs with each point being blended with the best direction's Qpel result, resulting in the best combined Qpel for the alternate direction with the given best direction's Qpel motion vector. Additionally, in a second case a Qpel optimized motion vector may be held constant and the best direction fractional search may be restarted holding alternate direction Qpel motion vector constant while searching for the optimal Hpel and Qpel of the best direction. For example, the first case may be considered as a depth first search (DFS) while the second case can be considered as a breadth first search (BFS) and the combined search may be considered a hybrid DFS and BFS search. The full search of every possible Qpel best direction with every Qpel alternate direction may be exponentially more expensive to compute. Advantageously, some embodiments may utilize the hybrid DFS/BFS combined search to provide good results with reduced computational requirements (e.g., for the fractional and bidirectional refinement in the inter+RDE module 72c in FIG. 10).

Turning now to FIG. 12, an embodiment of an advanced RD plus zeroCBF computation 120 may be utilized in one or more of the skip+RDE, inter+RDE, and intra+RDE modules of a VME. The computation 120 may include the rate distortion estimation (RDE) core compute stages of a forward transform (T), a forward quantization (Q), an inverse quantization (IQ), and an entropy coding bit estimator of syntax elements and coefficients. An inverse transform (IT) may also be performed to produce the reconstructed edge pixels for neighbor intra blocks (not shown). Various transform unit depth (TU) may be analyzed by any of the RDE messages automatically and the optimal transform size may be returned along with the RD cost associated with a given candidate CU. The kernel/control logic may then identify the CU with the best RD cost based on these results across two or more various PU and CU options available.

The CRE may compute the RD distortion for all the merge candidates that are either internally generated using the merge list (e.g., an implicit skip) or for external candidates that are provided by the encoder. The RD distortion cost may include the sum of squared differences between the original block and the reconstructed block (SSE)+bitcost as follows:

$$RDcost = SSE + \lambda * R \qquad [\text{Eq. 1}]$$

where SSE corresponds to distortion=$\Sigma$ (original−reconstructed)$^2$, R corresponds to the number of generated bits from an entropy encoder, and $\lambda$ corresponds to a Lagrange multiplier.

In some embodiments, zero coding bit flag support may be provided for inter+RDE and skip+RDE messages for candidates when checking for TU depth=0 only (e.g., no TU split), and not for intra+RDE messages. For example, the zero coding bit flag may denote what frequencies have at least one coefficient or zero coefficients. Zero CBF support may utilize the CRE block to compute the SSE assuming the bitcost to be zero. For example, additional SSE compute may be utilized in parallel with the existing SSE block. An additional distortion may be sent back to the encoder along with the current RD distortion. The encoder may determine whether to force zero CBF to the bitstream packer or not, based on some thresholds. For a 64×64 merge check, for example, the CRE may return the distortion for each of the merge candidates. In some embodiments, the CRE may also return the zero CBF distortion for each of those candidates.

The sum of square error (SSE) metric may be computed in either the spatial domain or frequency domain if the transform is approximately orthogonal between the source and the predicted block, measuring the visual degradation caused by quantization error introduced between Q and IQ. The remaining coefficients after Q may be entropy coded and the bitcost associated with those coefficients may be recorded. Along with a lambda factor, the SSE and bit cost may be combined together into a total RDO cost (e.g., see Eq. 1). By signaling no coefficients in the bitstream, the RDE may simulate an infinite quantization which results in zero coefficients transmitted to the decoder and the SSE may be computed without any IQ coefficients (e.g., as they were zeroed out), signaled to the decoder with a zero coded bit flag. If the RD cost of the zero CBF is better than the alternates, then the encoder logic may signal the bitstream packer unit to forcibly delete any coefficients.

Some embodiments may be improved or optimized for HEVC Main8 (8-bit encode), HEVC Main10 (10-bit encode) and/or VP9 and may advantageously provide greater than about 30% coding efficiency over AVC-based encoders at the same TU setting. For example, some embodiments may provide native support for bigger block sizes and new message types including the partition message. Some embodiments may support various range extensions for HEVC and/or VP9 which include new definitions of profiles and levels. For example, some embodiments may support profiles that define higher bit-depth (e.g., >10-bit) and different formats of chroma sampling (e.g., 444, 422, 400). Some embodiments may additionally, or alternatively, support profiles for Main 4:4:4 (8-bit), Main 4:4:4 (10-bit), Main 4:4:4 (12-bit), Main 4:4:4 Still Picture, Main 4:2:2 (8-bit), Main 4:2:2 (10-bit), Main 4:2:2 (12-bit), and Main 4:2:0 (10-bit) profiles. Other embodiments may provide support for more or fewer profiles.

In some embodiments, a HEVC-based VME may use an approximation of the 4-tap filter for fractional check. Some embodiments may use a 6-tap filter or an 8-tap filter for fractional check. While a 4-tap filter may provide a good approximation for the FBR check on the sum of absolute differences (SAD) domain, some embodiments of a HEVC-based may utilize a RDE pipeline based mode decision together with an accurate 8-tap filter based fractional interpolator for the FBR check to provide a substantial quality gain over the 4-tap interpolator. The HEVC-based VME may use an 8+8 approach to compute the best fractional pel position. The 8-tap may be based on an integer block size required to derive the fractional locations. For example, every 4×4 block may utilize a 12×12 integer block.

In some embodiments, the RDE based mode decision pipeline may support the distortion compute for luma pixels. Some embodiments may advantageously improve quality by including chroma rate distortions (RDs) along with the luma during the decision making. In some embodiments, the RDE pipeline may compute the chroma distortions as well. For example, a bit in the IME message may enable the chroma distortion computation. When enabled, all the distortions reported out of the VME may be luma+chroma based. Some embodiments may also provide an option to perform a chroma distortion compute on an input MV (e.g., similar to an explicit merge check for luma). For example, this option may be used to only check chroma on the best merge candidate instead of all of them, advantageously saving compute cycles and bandwidth. This option may also provide flexibility to the encoder when tuning for the different TU settings.

The foregoing examples are only illustrative of the wide variety of techniques that a HEVC-based VME may implement in accordance with some embodiments. Given the benefit of the present application, numerous other embodiments may be configured to create a network of decisions leading to an improved or optimal mode decision for balancing compression, quality, and performance.

Figure 13:
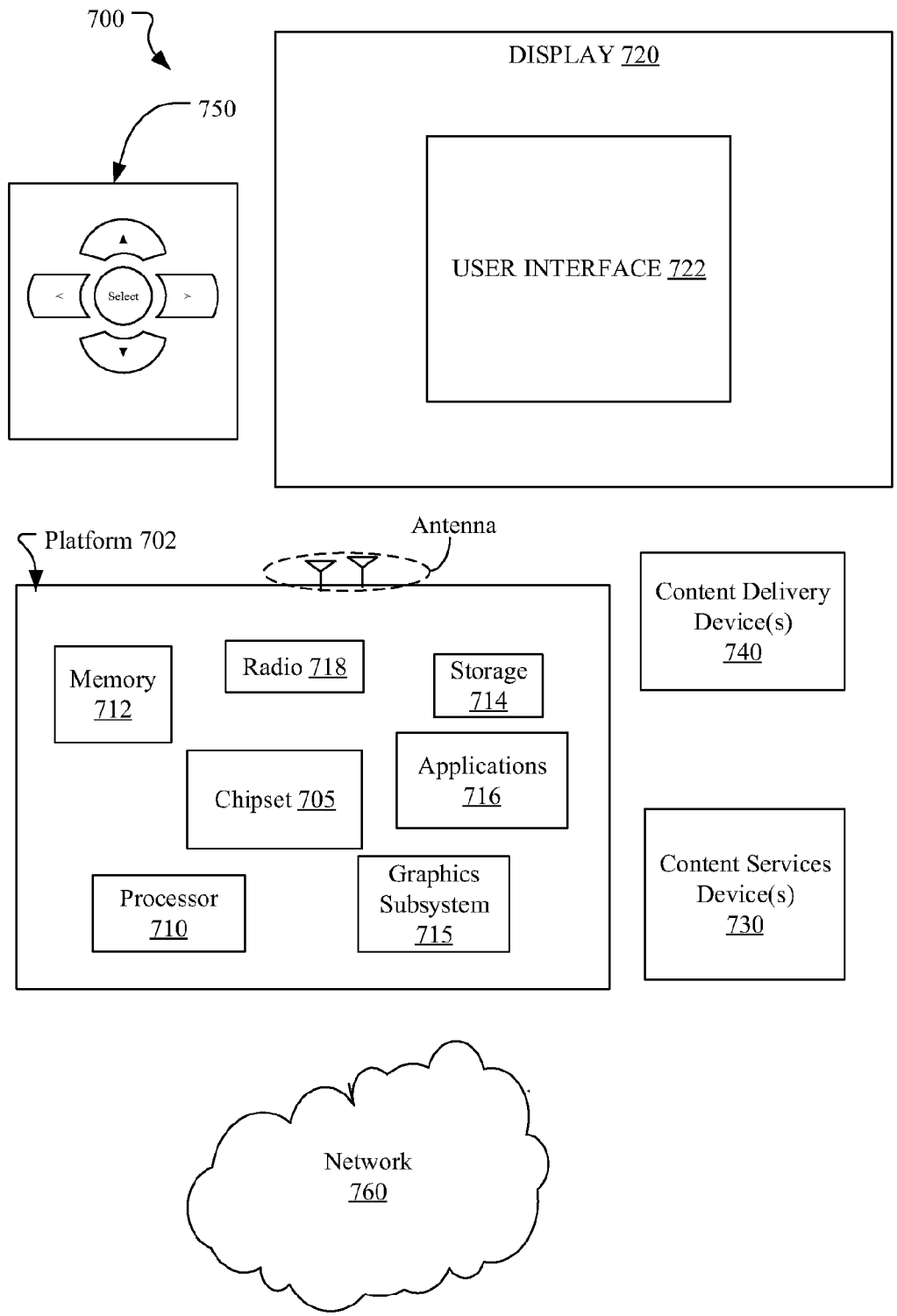
FIG. 13 is a block diagram of an example of a system having a navigation controller according to an embodiment.

FIG. 13 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, the system 700 comprises a platform 702 coupled to a display 720 that presents visual content. The platform 702 may receive video bitstream content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, the platform 702 may comprise any combination of a chipset 705, processor 710, memory 712, storage 714, graphics subsystem 715, applications 716 and/or radio 718 (e.g., network controller). The chipset 705 may provide intercommunication among the processor 710, memory 712, storage 714, graphics subsystem 715, applications 716 and/or radio 718. For example, the chipset 705 may include a storage adapter (not depicted) capable of providing intercommunication with the storage 714.

The processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, the processor 710 may comprise dual-core processor(s), dual-core mobile processor(s), and so forth.

The memory 712 may be implemented as a volatile memory device such as, but not limited to, a Random Access Memory (RAM), Dynamic Random Access Memory (DRAM), or Static RAM (SRAM).

The storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

The graphics subsystem 715 may perform processing of images such as still or video for display. The graphics subsystem 715 may be a graphics processing unit (GPU) or a visual processing unit (VPU), for example. An analog or digital interface may be used to communicatively couple the graphics subsystem 715 and display 720. For example, the interface may be any of a High-Definition Multimedia Interface (HDMI), DisplayPort, wireless HDMI, and/or wireless HD compliant techniques. The graphics subsystem 715 could be integrated into processor 710 or chipset 705. The graphics subsystem 715 could be a stand-alone card communicatively coupled to the chipset 705. In one example, the graphics subsystem 715 includes a noise reduction subsystem as described herein.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 718 may be a network controller including one or more radios capable of transmitting and receiving signals using various suitable wireless communications techniques. Such techniques may involve communications across one or more wireless networks. Exemplary wireless networks include (but are not limited to) wireless local area networks (WLAN5), wireless personal area networks (WPANs), wireless metropolitan area network (WMANs), cellular networks, and satellite networks. In communicating across such networks, radio 718 may operate in accordance with one or more applicable standards in any version.

In embodiments, the display 720 may comprise any television type monitor or display. The display 720 may comprise, for example, a computer display screen, touch screen display, video monitor, television-like device, and/or a television. The display 720 may be digital and/or analog. In embodiments, the display 720 may be a holographic display. Also, the display 720 may be a transparent surface that may receive a visual projection. Such projections may convey various forms of information, images, and/or objects. For example, such projections may be a visual overlay for a mobile augmented reality (MAR) application. Under the control of one or more software applications 716, the platform 702 may display user interface 722 on the display 720.

In embodiments, content services device(s) 730 may be hosted by any national, international and/or independent service and thus accessible to the platform 702 via the Internet, for example. The content services device(s) 730 may be coupled to the platform 702 and/or to the display 720. The platform 702 and/or content services device(s) 730 may be coupled to a network 760 to communicate (e.g., send and/or receive) media information to and from network 760. The content delivery device(s) 740 also may be coupled to the platform 702 and/or to the display 720.

In embodiments, the content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

The content services device(s) 730 receives content such as cable television programming including media information, digital information, and/or other content. Examples of content providers may include any cable or satellite television or radio or Internet content providers. The provided examples are not meant to limit embodiments.

In embodiments, the platform 702 may receive control signals from a navigation controller 750 having one or more navigation features. The navigation features of the controller 750 may be used to interact with the user interface 722, for example. In embodiments, the navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the controller 750 may be echoed on a display (e.g., display 720) by movements of a pointer, cursor, focus ring, or other visual indicators displayed on the display. For example, under the control of software applications 716, the navigation features located on the navigation controller 750 may be mapped to virtual navigation features displayed on the user interface 722, for example. In embodiments, the controller 750 may not be a separate component but integrated into the platform 702 and/or the display 720. Embodiments, however, are not limited to the elements or in the context shown or described herein.

In embodiments, drivers (not shown) may comprise technology to enable users to instantly turn on and off the platform 702 like a television with the touch of a button after initial boot-up, when enabled, for example. Program logic may allow the platform 702 to stream content to media adaptors or other content services device(s) 730 or content delivery device(s) 740 when the platform is turned "off." In addition, chipset 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in the system 700 may be integrated. For example, the platform 702 and the content services device(s) 730 may be integrated, or the platform 702 and the content delivery device(s) 740 may be integrated, or the platform 702, the content services device(s) 730, and the content delivery device(s) 740 may be integrated, for example. In various embodiments, the platform 702 and the display 720 may be an integrated unit. The display 720 and content service device(s) 730 may be integrated, or the display 720 and the content delivery device(s) 740 may be integrated, for example. These examples are not meant to limit the embodiments.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

The platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
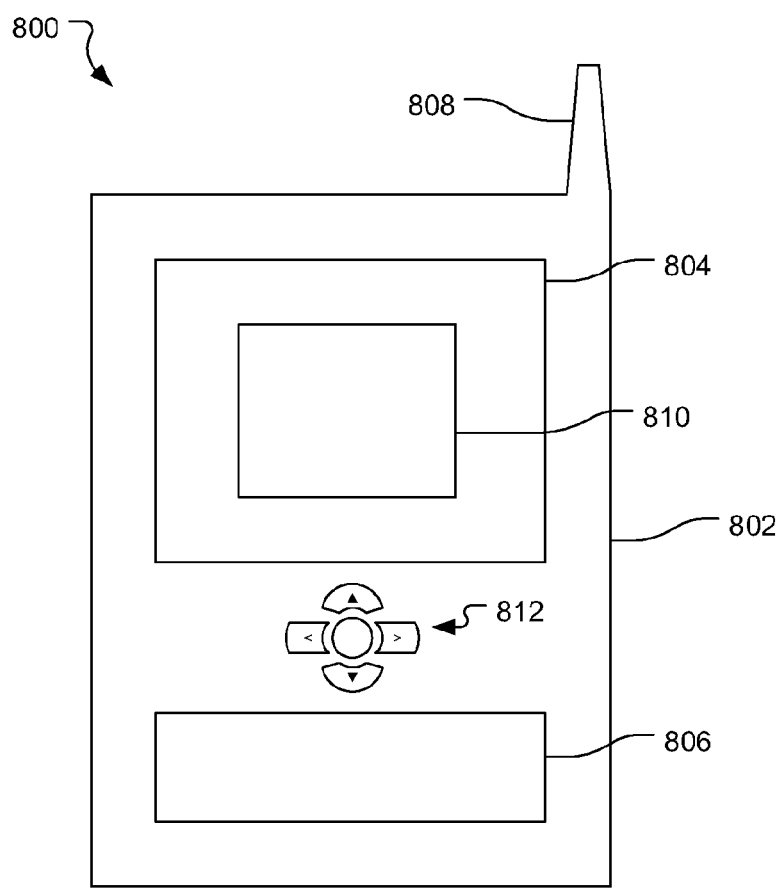
FIG. 14 is a block diagram of an example of a system having a small form factor according to an embodiment.

As described above, the system 700 may be embodied in varying physical styles or form factors. FIG. 14 illustrates embodiments of a small form factor device 800 in which the system 700 may be embodied. In embodiments, for example, the device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 14, the device 800 may comprise a housing 802, a display 804, an input/output (I/O) device 806, and an antenna 808. The device 800 also may comprise navigation features 812. The display 804 may comprise any suitable display unit for displaying information appropriate for a mobile computing device. The I/O device 806 may comprise any suitable I/O device for entering information into a mobile computing device. Examples for the I/O device 806 may include an alphanumeric keyboard, a numeric keypad, a touch pad, input keys, buttons, switches, rocker switches, microphones, speakers, voice recognition device and software, and so forth. Information also may be entered into the device 800 by way of microphone. Such information may be digitized by a voice recognition device. The embodiments are not limited in this context.

In accordance with some embodiments, the system 700 and/or the device 800 may be advantageously configured with one or more features of a modular motion estimation engine for tree-based video formats as described herein. For example, the system 700 and/or the device 800 may include one or more of the features described in the below Additional Notes and Examples.

Additional Notes and Examples:

Example 1 may include a motion estimation system, comprising a processor, memory communicatively coupled to the processor, and logic communicatively coupled to the processor to determine a residual error based on coding unit information, and determine a candidate coding unit and an associated rate distortion cost based on the residual error.

Example 2 may include the system of Example 1, wherein the logic is further to determine the residual error based on the coding unit information and a merge list, determine merge information based on a zero coding bit factor, and determine the candidate coding unit, the associated rate distortion cost, and edge pixel information based on the residual error and the merge information.

Example 3 may include the system of Example 1, wherein the logic is further to determine the residual error based on the coding unit information and one or more of a fractional motion estimate and a bidirectional motion estimate, determine inter-frame information based on a zero coding bit factor, and determine the candidate coding unit, the associated rate distortion cost, and edge pixel information based on the residual error and the inter-frame information.

Example 4 may include the system of Example 3, wherein the logic is further to determine one or more of the fractional motion estimate and the bidirectional motion estimate based on a depth first search and a breadth first search.

Example 5 may include the system of Example 1, wherein the logic is further to determine the residual error based on the coding unit information and an intra-frame mode search with reconstructed neighbor pixel information, determine intra-frame information based on a zero coding bit factor, and determine the candidate coding unit, the associated rate distortion cost, and edge pixel information based on the residual error and the intra-frame information.

Example 6 may include the system of any of Examples 1 to 5, wherein the logic is further to perform an integer motion search based on another set of coding unit information, determine partition unit candidates based on the integer motion search, and determine another candidate coding unit based on the partition unit candidates.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to determine a residual error based on coding unit information, and determine a candidate coding unit and an associated rate distortion cost based on the residual error.

Example 8 may include the apparatus of Example 7, wherein the logic is further to determine the residual error based on the coding unit information and a merge list, determine merge information based on a zero coding bit factor, and determine the candidate coding unit, the associated rate distortion cost, and edge pixel information based on the residual error and the merge information.

Example 9 may include the apparatus of Example 7, wherein the logic is further to determine the residual error based on the coding unit information and one or more of a fractional motion estimate and a bidirectional motion estimate, determine inter-frame information based on a zero coding bit factor, and determine the candidate coding unit, the associated rate distortion cost, and edge pixel information based on the residual error and the inter-frame information.

Example 10 may include the apparatus of Example 9, wherein the logic is further to determine one or more of the fractional motion estimate and the bidirectional motion estimate based on a depth first search and a breadth first search.

Example 11 may include the apparatus of Example 7, wherein the logic is further to determine the residual error based on the coding unit information and an intra-frame mode search with reconstructed neighbor pixel information, determine intra-frame information based on a zero coding bit factor, and determine the candidate coding unit, the associated rate distortion cost, and edge pixel information based on the residual error and the intra-frame information.

Example 12 may include the apparatus of any of Examples 7 to 11, wherein the logic is further to perform an integer motion search based on another set of coding unit information, determine partition unit candidates based on the integer motion search, and determine another candidate coding unit based on the partition unit candidates.

Example 13 may include the apparatus of Example 7, wherein the logic coupled to the one or more substrates includes transistor channel regions that are positioned within the one or more substrates.

Example 14 may include a method of estimating motion, comprising determining a residual error based on coding unit information, and determining a candidate coding unit and an associated rate distortion cost based on the residual error.

Example 15 may include the method of Example 14, further comprising determining the residual error based on the coding unit information and a merge list, determining merge information based on a zero coding bit factor, and determining the candidate coding unit, the associated rate distortion cost, and edge pixel information based on the residual error and the merge information.

Example 16 may include the method of Example 14, further comprising determining the residual error based on the coding unit information and one or more of a fractional motion estimate and a bidirectional motion estimate, determining inter-frame information based on a zero coding bit factor, and determining the candidate coding unit, the associated rate distortion cost, and edge pixel information based on the residual error and the inter-frame information.

Example 17 may include the method of Example 16, further comprising determining one or more of the fractional motion estimate and the bidirectional motion estimate based on a depth first search and a breadth first search.

Example 18 may include the method of Example 14, further comprising determining the residual error based on the coding unit information and an intra-frame mode search with reconstructed neighbor pixel information, determining intra-frame information based on a zero coding bit factor, and determining the candidate coding unit, the associated rate distortion cost, and edge pixel information based on the residual error and the intra-frame information.

Example 19 may include the method of any of Examples 14 to 18, further comprising performing an integer motion search based on another set of coding unit information, determining partition unit candidates based on the integer motion search, and determining another candidate coding unit based on the partition unit candidates.

Example 20 may include at least one computer readable medium, comprising a set of instructions, which when executed by a computing device, cause the computing device to determine a residual error based on coding unit information, and determine a candidate coding unit and an associated rate distortion cost based on the residual error.

Example 21 may include the at least one computer readable medium of Example 20, comprising a further set of instructions, which when executed by the computing device, cause the computing device to determine the residual error based on the coding unit information and a merge list, determine merge information based on a zero coding bit factor, and determine the candidate coding unit, the associated rate distortion cost, and edge pixel information based on the residual error and the merge information.

Example 22 may include the at least one computer readable medium of Example 20, comprising a further set of instructions, which when executed by the computing device, cause the computing device to determine the residual error based on the coding unit information and one or more of a fractional motion estimate and a bidirectional motion estimate, determine inter-frame information based on a zero coding bit factor, and determine the candidate coding unit, the associated rate distortion cost, and edge pixel information based on the residual error and the inter-frame information.

Example 23 may include the at least one computer readable medium of Example 22, comprising a further set of instructions, which when executed by the computing device, cause the computing device to determine one or more of the fractional motion estimate and the bidirectional motion estimate based on a depth first search and a breadth first search.

Example 24 may include the at least one computer readable medium of Example 20, comprising a further set of instructions, which when executed by the computing device, cause the computing device to determine the residual error based on the coding unit information and an intra-frame mode search with reconstructed neighbor pixel information, determine intra-frame information based on a zero coding bit factor, and determine the candidate coding unit, the associated rate distortion cost, and edge pixel information based on the residual error and the intra-frame information.

Example 25 may include the at least one computer readable medium of any of Examples 20 to 24, comprising a further set of instructions, which when executed by the computing device, cause the computing device to perform an integer motion search based on another set of coding unit information, determine partition unit candidates based on the integer motion search, and determine another candidate coding unit based on the partition unit candidates.

Example 26 may include a motion estimator apparatus, including one or more substrates, and logic communicatively coupled to the one or more substrates to perform one or more of merge and skip residual error analysis on a first coding unit packet and determine a best merge candidate coding unit and a first rate distortion optimization cost based on the analysis, perform integer motion estimation on second coding unit packet and determine a best partition candidate coding unit and a second rate distortion optimization cost based on the partition candidates, perform fractional and bidirectional motion estimation residual error analysis on a third coding unit packet and determine a best inter candidate coding unit and a third rate distortion optimization cost based on the analysis, and perform an intra mode search residual error analysis on a fourth coding unit packet and determine a best intra candidate coding unit and a fourth rate distortion optimization cost based on the analysis.

Example 27 may include the apparatus of Example 26, wherein the logic is further to process a hierarchical partition message.

Example 28 may include the apparatus of Example 26, wherein the logic is further to skip an intra check.

Example 29 may include the apparatus of Example 28, wherein the logic is further to support up to four predictors in one call.

Example 30 may include the apparatus of Example 28, wherein the logic is further to support a source size of sixty-four by sixty-four pixels.

Example 31 may include the apparatus of Example 28, wherein the logic is further to support intra directional filters.

Example 32 may include the apparatus of Example 28, wherein the logic is further to support intra streamout.

Example 33 may include the apparatus of Example 26, wherein the logic is further to support a source size of sixty-four by sixty-four pixels for fractional motion estimation.

Example 34 may include the apparatus of Example 33, wherein the logic is further to perform fractional motion estimation based on one or more of a half pel and a quarter pel distortion mesh.

Example 35 may include the apparatus of Example 26, wherein the logic is further to support a source size of sixty-four by sixty-four pixels for bidirectional motion estimation.

Example 36 may include the apparatus of Example 26, wherein the logic is further to offload a skip intra check for skip replacement of a coding unit.

Example 37 may include the apparatus of Example 26, wherein the logic is further to process a residual prediction message.

Example 38 may include the apparatus of Example 37, wherein the logic is further to return a residual to a kernel.

Example 39 may include a motion estimation apparatus, comprising means for determining a residual error based on coding unit information, and means for determining a candidate coding unit and an associated rate distortion cost based on the residual error.

Example 40 may include the apparatus of Example 39, further comprising means for determining the residual error based on the coding unit information and a merge list, means for determining merge information based on a zero coding bit factor, and means for determining the candidate coding unit, the associated rate distortion cost, and edge pixel information based on the residual error and the merge information.

Example 41 may include the apparatus of Example 39, further comprising means for determining the residual error based on the coding unit information and one or more of a fractional motion estimate and a bidirectional motion estimate, means for determining inter-frame information based on a zero coding bit factor, and means for determining the candidate coding unit, the associated rate distortion cost, and edge pixel information based on the residual error and the inter-frame information.

Example 42 may include the apparatus of Example 41, further comprising means for determining one or more of the fractional motion estimate and the bidirectional motion estimate based on a depth first search and a breadth first search.

Example 43 may include the apparatus of Example 39, further comprising means for determining the residual error based on the coding unit information and an intra-frame mode search with reconstructed neighbor pixel information, means for determining intra-frame information based on a zero coding bit factor, and means for determining the candidate coding unit, the associated rate distortion cost, and edge pixel information based on the residual error and the intra-frame information.

Example 44 may include the apparatus of any of Examples 39 to 43, further comprising means for performing an integer motion search based on another set of coding unit information, means for determining partition unit candidates based on the integer motion search, and means for determining another candidate coding unit based on the partition unit candidates.

Example 45 may include the apparatus of Example 39, further comprising means for processing a hierarchical partition message.

Example 46 may include the apparatus of Example 39, further comprising means for skipping an intra check.

Example 47 may include the apparatus of Example 46, wherein the logic is further to means for supporting up to four predictors in one call.

Example 48 may include the apparatus of Example 39, wherein the logic is further to means for performing fractional motion estimation based on one or more of a half pel and a quarter pel distortion mesh.

Example 49 may include the apparatus of Example 39, wherein the logic is further to means for offloading a skip intra check for skip replacement of a coding unit.

Example 50 may include the apparatus of Example 39, wherein the logic is further to means for returning a residual to a kernel.

Example 51 may include an electronic processing system, comprising a graphics processor, memory communicatively coupled to the graphics processor to store video information, and a modular motion estimator communicatively coupled to the graphics processor and the memory, the modular motion estimator including a motion estimation kernel, and motion estimation circuitry communicatively coupled to the motion estimator kernel, wherein the motion estimation kernel and the motion estimator circuitry includes logic to partition a first coding unit of the video information into two or more smaller coding units based on a partition message, accelerate processing of at least one of the two or more smaller coding units, and estimate motion for a frame based at least partially on results of the accelerated processing.

Example 52 may include the system of Example 51, wherein the logic is further to provide two or more candidates for a transform unit, and select one of the two or more candidates for the transform unit based on an analysis of the two or more candidates.

Example 53 may include the system of Example 51, wherein the logic is further to support at least four predictors for a skip engine.

Example 54 may include the system of Example 51, wherein the logic is further to perform fractional motion estimation based on one or more of a half pel distortion mesh and a quarter pel distortion mesh.

Example 55 may include the system of any of Examples 51 to 54, wherein the logic is further to offload a skip engine based on a skip refinement message.

Example 56 may include the system of any of Examples 51 to 54, wherein the logic is further to return a residual to a kernel based on a residual prediction message.

Example 57 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to partition a first coding unit into two or more smaller coding units based on a partition message, accelerate processing of at least one of the two or more smaller coding units, and estimate motion for a frame based at least partially on results of the accelerated processing.

Example 58 may include the apparatus of Example 57, wherein the logic is further to provide two or more candidates for a transform unit, and select one of the two or more candidates for the transform unit based on an analysis of the two or more candidates.

Example 59 may include the apparatus of Example 57, wherein the logic is further to support at least four predictors for a skip engine.

Example 60 may include the apparatus of Example 57, wherein the logic is further to perform fractional motion estimation based on one or more of a half pel distortion mesh and a quarter pel distortion mesh.

Example 61 may include the apparatus of any of Examples 57 to 60, wherein the logic is further to offload a skip engine based on a skip refinement message.

Example 62 may include the apparatus of any of Examples 57 to 60, wherein the logic is further to return a residual to a kernel based on a residual prediction message.

Example 63 may include a method of estimating motion, comprising partitioning a first coding unit into two or more smaller coding units based on a partition message, accelerating processing of at least one of the two or more smaller coding units, and estimating motion for a frame based at least partially on results of the accelerated processing.

Example 64 may include the method of Example 63, further comprising providing two or more candidates for a transform unit, and selecting one of the two or more candidates for the transform unit based on an analysis of the two or more candidates.

Example 65 may include the method of Example 63, further comprising supporting at least four predictors for a skip engine.

Example 66 may include the method of Example 63, further comprising performing fractional motion estimation based on one or more of a half pel distortion mesh and a quarter pel distortion mesh, Example 67 may include the method of any of Examples 63 to 66, further comprising offloading a skip engine based on a skip refinement message.

Example 68 may include the method of any of Examples 63 to 66, further comprising returning a residual to a kernel based on a residual prediction message.

Example 69 may include at least one computer readable medium, comprising a set of instructions, which when executed by a computing device, cause the computing device to partition a first coding unit into two or more smaller coding units based on a partition message, accelerate processing of at least one of the two or more smaller coding units, and estimate motion for a frame based at least partially on results of the accelerated processing.

Example 70 may include the at least one computer readable medium of Example 69, comprising a further set of instructions, which when executed by the computing device, cause the computing device to provide two or more candidates for a transform unit, and select one of the two or more candidates for the transform unit based on an analysis of the two or more candidates.

Example 71 may include the at least one computer readable medium of Example 69, comprising a further set of instructions, which when executed by the computing device, cause the computing device to support at least four predictors for a skip engine.

Example 72 may include the at least one computer readable medium of Example 69, comprising a further set of instructions, which when executed by the computing device, cause the computing device to perform fractional motion estimation based on one or more of a half pel distortion mesh and a quarter pel distortion mesh.

Example 73 may include the at least one computer readable medium of any of Examples 69 to 72, comprising a further set of instructions, which when executed by the computing device, cause the computing device to offload a skip engine based on a skip refinement message.

Example 74 may include the at least one computer readable medium of any of Examples 69 to 72, comprising a further set of instructions, which when executed by the computing device, cause the computing device to return a residual to a kernel based on a residual prediction message.

Example 75 may include a modular motion estimator apparatus, comprising means for partitioning a first coding unit into two or more smaller coding units based on a partition message, means for accelerating processing of at least one of the two or more smaller coding units, and means for estimating motion for a frame based at least partially on results of the accelerated processing.

Example 76 may include the apparatus of Example 75, further comprising means for providing two or more candidates for a transform unit, and means for selecting one of the two or more candidates for the transform unit based on an analysis of the two or more candidates.

Example 77 may include the apparatus of Example 75, further comprising means for supporting at least four predictors for a skip engine.

Example 78 may include the apparatus of Example 75, further comprising means for performing fractional motion estimation based on one or more of a half pel distortion mesh and a quarter pel distortion mesh.

Example 79 may include the apparatus of any of Examples 75 to 78, further comprising means for offloading a skip engine based on a skip refinement message.

Example 80 may include the apparatus of any of Examples 75 to 78, further comprising means for returning a residual to a kernel based on a residual prediction message.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A motion estimation system, comprising:
a processor;
memory communicatively coupled to the processor; and
logic communicatively coupled to the processor to:
    determine a residual error based on coding unit information and a merge list,
    determine merge information based on a zero coding bit factor, and
    determine a candidate coding unit, an associated rate distortion cost, and edge pixel information based on the residual error and the merge information.

2. The system of claim 1, wherein the logic is further to:
determine the residual error based on the coding unit information and one or more of a fractional motion estimate and a bidirectional motion estimate;
determine inter-frame information based on a zero coding bit factor; and
determine the candidate coding unit, the associated rate distortion cost, and the edge pixel information based on the residual error and the inter-frame information.

3. The system of claim 2, wherein the logic is further to:
determine one or more of the fractional motion estimate and the bidirectional motion estimate based on a depth first search and a breadth first search.

4. The system of claim 1, wherein the logic is further to:
determine the residual error based on the coding unit information and an intra-frame mode search with information related to one or more reconstructed neighbor pixels;
determine intra-frame information based on the zero coding bit factor; and
determine the candidate coding unit, the associated rate distortion cost, and the edge pixel information based on the residual error and the intra-frame information.

5. The system of claim 1, wherein the logic is further to:
perform an integer motion search based on another set of coding unit information;
determine partition unit candidates based on the integer motion search; and
determine another candidate coding unit based on the partition unit candidates.

6. A semiconductor package apparatus, comprising:
one or more substrates; and
logic coupled to the one or more substrates, wherein the logic is at least partly implemented in one or more of configurable logic and fixed-functionality hardware logic, the logic coupled to the one or more substrates to:
determine a residual error based on coding unit information and one or more of a fractional motion estimate and a bidirectional motion estimate,
determine inter-frame information based on a zero coding bit factor, and
determine a candidate coding unit, an associated rate distortion cost, and edge pixel information based on the residual error and the inter-frame information.

7. The apparatus of claim 6, wherein the logic is further to:
determine the residual error based on the coding unit information and a merge list;
determine merge information based on the zero coding bit factor; and
determine the candidate coding unit, the associated rate distortion cost, and the edge pixel information based on the residual error and the merge information.

8. The apparatus of claim 6, wherein the logic is further to:
determine one or more of the fractional motion estimate and the bidirectional motion estimate based on a depth first search and a breadth first search.

9. The apparatus of claim 6, wherein the logic is further to:
determine the residual error based on the coding unit information and an intra-frame mode search with information related to one or more reconstructed neighbor pixels;
determine intra-frame information based on the zero coding bit factor; and
determine the candidate coding unit, the associated rate distortion cost, and the edge pixel information based on the residual error and the intra-frame information.

10. The apparatus of claim 6, wherein the logic is further to:
perform an integer motion search based on another set of coding unit information;
determine partition unit candidates based on the integer motion search; and
determine another candidate coding unit based on the partition unit candidates.

11. The apparatus of claim 6, wherein the logic coupled to the one or more substrates includes transistor channel regions that are positioned within the one or more substrates.

12. A method of estimating motion, comprising:
determining a residual error based on coding unit information and an intra-frame mode search with information related to one or more reconstructed neighbor pixels;
determining intra-frame information based on a zero coding bit factor; and
determining a candidate coding unit, an associated rate distortion cost, and edge pixel information based on the residual error and the intra-frame information.

13. The method of claim 12, further comprising:
determining the residual error based on the coding unit information and a merge list;
determining merge information based on the zero coding bit factor; and
determining the candidate coding unit, the associated rate distortion cost, and the edge pixel information based on the residual error and the merge information.

14. The method of claim 12, further comprising:
determining the residual error based on the coding unit information and one or more of a fractional motion estimate and a bidirectional motion estimate;
determining inter-frame information based on the zero coding bit factor; and
determining the candidate coding unit, the associated rate distortion cost, and the edge pixel information based on the residual error and the inter-frame information.

15. The method of claim 14, further comprising:
determining one or more of the fractional motion estimate and the bidirectional motion estimate based on a depth first search and a breadth first search.

16. The method of claim 12, further comprising:
performing an integer motion search based on another set of coding unit information;
determining partition unit candidates based on the integer motion search; and
determining another candidate coding unit based on the partition unit candidates.

17. At least one non-transitory computer readable medium, comprising a set of instructions, which when executed by a computing device, cause the computing device to:
determine a residual error based on coding unit information and a merge list;
determine merge information based on a zero coding bit factor; and
determine a candidate coding unit, an associated rate distortion cost, and edge pixel information based on the residual error and the merge information.

18. The at least one non-transitory computer readable medium of claim 17, comprising a further set of instructions, which when executed by the computing device, cause the computing device to:

determine the residual error based on the coding unit information and one or more of a fractional motion estimate and a bidirectional motion estimate;

determine inter-frame information based on the zero coding bit factor; and determine the candidate coding unit, the associated rate distortion cost, and the edge pixel information based on the residual error and the inter-frame information.

19. The at least one non-transitory computer readable medium of claim 18, comprising a further set of instructions, which when executed by the computing device, cause the computing device to:

determine one or more of the fractional motion estimate and the bidirectional motion estimate based on a depth first search and a breadth first search.

20. The at least one non-transitory computer readable medium of claim 17, comprising a further set of instructions, which when executed by the computing device, cause the computing device to:

determine the residual error based on the coding unit information and an intra-frame mode search with information related to one or more reconstructed neighbor pixels;

determine intra-frame information based on the zero coding bit factor; and determine the candidate coding unit, the associated rate distortion cost, and the edge pixel information based on the residual error and the intra-frame information.

21. The at least one non-transitory computer readable medium of claim 17, comprising a further set of instructions, which when executed by the computing device, cause the computing device to:

perform an integer motion search based on another set of coding unit information;

determine partition unit candidates based on the integer motion search; and determine another candidate coding unit based on the partition unit candidates.

\* \* \* \* \*